US010291969B2

(12) United States Patent
Takeuchi et al.

(10) Patent No.: US 10,291,969 B2
(45) Date of Patent: May 14, 2019

(54) REAR CABLE MANAGEMENT

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 15/432,281

(22) Filed: Feb. 14, 2017

(65) Prior Publication Data

US 2018/0235094 A1 Aug. 16, 2018

(51) Int. Cl.
*H05K 5/00* (2006.01)
*H04Q 1/02* (2006.01)

(52) U.S. Cl.
CPC ................ *H04Q 1/13* (2013.01); *H04Q 1/02* (2013.01)

(58) Field of Classification Search
CPC ........................................................ H05K 7/14
USPC ..................................................... 361/679.01
See application file for complete search history.

(56) References Cited

U.S. PATENT DOCUMENTS

| | | | |
|---|---|---|---|
| 2,865,979 | A | 12/1958 | Klassen |
| 4,353,518 | A | 10/1982 | Taylor et al. |
| 4,688,885 | A | 8/1987 | Poteat et al. |
| 5,100,221 | A | 3/1992 | Carney et al. |
| 5,114,356 | A | 5/1992 | Taybl et al. |
| 5,613,021 | A | 3/1997 | Saito et al. |
| 5,775,755 | A | 7/1998 | Covert et al. |
| 6,070,742 | A | 6/2000 | McAnally et al. |
| 6,263,141 | B1 | 7/2001 | Smith |
| 6,293,707 | B1 | 9/2001 | Wild |
| 6,327,139 | B1 | 12/2001 | Champion et al. |
| 6,356,697 | B1 | 3/2002 | Braga et al. |

(Continued)

FOREIGN PATENT DOCUMENTS

| | | | |
|---|---|---|---|
| CA | 2090363 | C | 11/1998 |
| CN | 1054854 | A | 9/1991 |

(Continued)

OTHER PUBLICATIONS

Chinese Search Report for Application No. 201380016146.9 dated Sep. 25, 2017.

(Continued)

*Primary Examiner* — Jerry Wu
(74) *Attorney, Agent, or Firm* — Lerner, David, Littenberg, Krumholz & Mentlik, LLP

(57) ABSTRACT

A communication system includes a housing, a tray, and a guide arm. The tray has a plurality of ports each having a rear face connectable to a rear cable. The tray is movably engaged with the housing and has a first position substantially inside the housing and a second position substantially outside the housing. The guide arm has a first end pivotably attached to the tray between the plurality of ports and a rear of the housing, and a second free end opposite the first end. The guide arm is adapted to rotate from a first rotational position in which the guide arm is substantially parallel to the rear of the housing to a second rotational position in which the free end points toward the rear of the housing as the tray transitions from the first position to the second position.

14 Claims, 18 Drawing Sheets

(56) References Cited

U.S. PATENT DOCUMENTS

| | | | | |
|---|---|---|---|---|
| 6,392,149 | B1 | 5/2002 | Kim et al. | |
| 6,424,781 | B1 | 7/2002 | Puetz et al. | |
| 6,442,030 | B1 * | 8/2002 | Mammoser | G06F 1/1601 248/917 |
| 6,556,763 | B1 | 4/2003 | Puetz et al. | |
| 6,902,069 | B2 | 6/2005 | Hartman et al. | |
| 6,925,241 | B2 | 8/2005 | Bohle et al. | |
| 7,198,409 | B2 | 4/2007 | Smith et al. | |
| 7,233,731 | B2 | 6/2007 | Solheid et al. | |
| 7,335,056 | B1 | 2/2008 | Clark et al. | |
| 7,352,945 | B2 | 4/2008 | Holmberg et al. | |
| 7,397,997 | B2 | 7/2008 | Ferris et al. | |
| 7,460,758 | B2 | 12/2008 | Xin | |
| 7,746,667 | B1 | 6/2010 | Baiza et al. | |
| 7,809,233 | B2 | 10/2010 | Smith et al. | |
| 7,809,234 | B2 | 10/2010 | Smith et al. | |
| 7,816,602 | B2 | 10/2010 | Landry et al. | |
| 7,874,869 | B2 | 1/2011 | Chern et al. | |
| RE42,258 | E | 3/2011 | Thompson et al. | |
| 8,068,715 | B2 | 11/2011 | Kewitsch | |
| 8,175,425 | B2 | 5/2012 | Chen | |
| 8,179,684 | B2 | 5/2012 | Smrha et al. | |
| 8,263,861 | B2 | 9/2012 | Landry et al. | |
| 8,705,929 | B2 | 4/2014 | Kowalczyk et al. | |
| 8,731,361 | B2 | 5/2014 | Anderson et al. | |
| 8,811,791 | B2 | 8/2014 | Solheid et al. | |
| 8,861,918 | B2 | 10/2014 | Vazquez et al. | |
| 8,938,147 | B2 | 1/2015 | Krampotich et al. | |
| 8,939,792 | B2 | 1/2015 | Takeuchi et al. | |
| 9,071,890 | B2 | 6/2015 | Ruiz | |
| 9,122,021 | B2 | 9/2015 | Elenbaas et al. | |
| 9,201,206 | B2 | 12/2015 | Smith et al. | |
| 2001/0017480 | A1 * | 8/2001 | Ando | A47C 7/72 297/188.08 |
| 2002/0045387 | A1 | 4/2002 | Schmidt et al. | |
| 2002/0117942 | A1 | 8/2002 | Audibert et al. | |
| 2003/0129871 | A1 | 7/2003 | Follingstad | |
| 2004/0074852 | A1 | 4/2004 | Knudsen et al. | |
| 2004/0178312 | A1 | 9/2004 | Parsons | |
| 2004/0219829 | A1 | 11/2004 | Clark et al. | |
| 2004/0251220 | A1 | 12/2004 | Mertesdorf et al. | |
| 2005/0111809 | A1 | 5/2005 | Giraud et al. | |
| 2006/0018622 | A1 | 1/2006 | Caveney et al. | |
| 2006/0162948 | A1 | 7/2006 | Rinderer et al. | |
| 2007/0096606 | A1 | 5/2007 | Ryu | |
| 2007/0189692 | A1 | 8/2007 | Zimmel et al. | |
| 2007/0230889 | A1 | 10/2007 | Sato et al. | |
| 2008/0002937 | A1 | 1/2008 | Spisany et al. | |
| 2008/0205843 | A1 | 8/2008 | Castonguay et al. | |
| 2009/0067800 | A1 | 3/2009 | Vazquez et al. | |
| 2009/0078834 | A1 | 3/2009 | Chen et al. | |
| 2009/0086441 | A1 | 4/2009 | Randall et al. | |
| 2009/0238533 | A1 | 9/2009 | Stansbury et al. | |
| 2010/0000758 | A1 * | 1/2010 | Bravo | H02G 3/16 174/60 |
| 2010/0008623 | A2 | 1/2010 | Arol et al. | |
| 2010/0054659 | A1 | 3/2010 | Pnini et al. | |
| 2010/0159742 | A1 | 6/2010 | Chen | |
| 2010/0220964 | A1 | 9/2010 | de Jong et al. | |
| 2010/0248535 | A1 | 9/2010 | Chern et al. | |
| 2010/0310221 | A1 | 12/2010 | Le Dissez | |
| 2010/0310225 | A1 | 12/2010 | Anderson et al. | |
| 2011/0116757 | A1 | 5/2011 | Vanmeulen et al. | |
| 2011/0267794 | A1 | 11/2011 | Anderson et al. | |
| 2011/0317971 | A1 | 12/2011 | Zhang et al. | |
| 2012/0019117 | A1 | 1/2012 | Dunwoody et al. | |
| 2012/0321255 | A1 | 12/2012 | Kewitsch | |
| 2013/0196538 | A1 | 8/2013 | Takeuchi et al. | |
| 2014/0248028 | A1 | 9/2014 | Campbell et al. | |
| 2014/0262487 | A1 | 9/2014 | Takeuchi et al. | |
| 2014/0348481 | A1 | 11/2014 | Giraud et al. | |
| 2014/0354131 | A1 | 12/2014 | Takeuchi et al. | |
| 2014/0355217 | A1 | 12/2014 | Takeuchi et al. | |
| 2014/0357118 | A1 | 12/2014 | Takeuchi et al. | |
| 2015/0253529 | A1 | 9/2015 | Lu et al. | |
| 2015/0268436 | A1 | 9/2015 | Blackwell, Jr. et al. | |
| 2015/0301298 | A1 | 10/2015 | Frith et al. | |
| 2016/0047999 | A1 | 2/2016 | Alexi et al. | |
| 2016/0309611 | A1 | 10/2016 | Yi | |
| 2016/0330859 | A1 | 11/2016 | Chen et al. | |

FOREIGN PATENT DOCUMENTS

| | | | | |
|---|---|---|---|---|
| CN | 1304569 | A | 7/2001 | |
| CN | 1353825 | A | 6/2002 | |
| CN | 2503628 | Y | 7/2002 | |
| CN | 2511052 | Y | 9/2002 | |
| CN | 1799296 | A | 7/2006 | |
| CN | 1897365 | A | 1/2007 | |
| CN | 101480062 | A | 7/2009 | |
| CN | 201365322 | Y | 12/2009 | |
| CN | 102177633 | A | 9/2011 | |
| CN | 103535048 | A | 1/2014 | |
| CN | 104053334 | B | 11/2016 | |
| DE | 19745568 | A1 * | 6/1999 | H02G 11/00 |
| EP | 0207926 | A2 | 1/1987 | |
| EP | 0795935 | A2 | 9/1997 | |
| WO | 2008051436 | A2 | 5/2008 | |

OTHER PUBLICATIONS

Partial International Search Report for Application No. PCT/US2013/023176 dated May 2, 2013.
International Search Report for Application No. PCT/US2013/023176 dated Jun. 27, 2013.
Partial International Search Report for Application No. PCT/US2013/033701 dated Jul. 11, 2013.
International Search Report and Written Opinion for Application No. PCT/US2013/033701 dated Sep. 2, 2013.
International Search Report and Written Opinion for Application No. PCT/US2014/021953 dated Jun. 25, 2014.
International Search Report from PCT/US2018/017924, dated Apr. 23, 2018, pp. 1-2.
Chinese Search Report for CN Application No. 2017106771995, dated Oct. 24, 2018.

* cited by examiner

REAR CABLE MANAGEMENT

BACKGROUND OF THE DISCLOSURE

The present disclosure generally relates to a device and a system for routing and managing cables coupled to communication connectors, adapters, and/or ports. More particularly, the present disclosure relates to rear cable routing and management systems for patch panel devices.

In communications cabinets and racks, a multitude of cables are interconnected to one another through connectors, e.g., adapters. A cable organization unit typically has a tray or a shelf or a similar platform, which supports the connectors. Examples of cable organization units include patch panels.

A patch panel houses cable connectors and in the majority of cases is rack mounted. The patch panel typically is two-sided; the front of the patch panel provides for connections to relatively short wires or cables, and the rear of the patch panel usually provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be part of longer cables. The patch panel facilitates interconnecting, monitoring, and circuit testing of equipment without necessitating costly switching equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. It is desirable to provide patch panels having increased connector port density, i.e., the number of locations or ports per unit volume of area for providing connections. To this end, smaller sized connectors are increasingly being utilized.

A variety of optical fiber connectors are available, with the Subscriber Connector (SC) and the Lucent Connector (LC) being the most common. The differences among the types of connectors include dimensions and methods of mechanical coupling. For instance, SC connectors use a round 2.5 mm ferrule to hold a single fiber and use a push-on/pull-off mating mechanism. The ferrule of an LC connector is half the size as that of an SC connector, measuring only 1.25 mm. LC connectors use a retaining tab mechanism, which is similar to that found on a household phone connector.

In data communication and telecommunication applications, small connectors, e.g., LC, are increasingly replacing traditional connectors, e.g., SC. The main advantage of small connectors over larger sized connectors is the ability to provide a higher number of fibers per unit of rack space. Since the LC connector is roughly half the size as the SC connector, the placement of almost twice the number of connectors is possible within the same amount of space by using the LC connector instead of the SC connector.

However, there are disadvantages associated with using smaller connectors. As more connectors are placed within the same amount of space, accessing the connectors which is often performed by hand may present a challenge. Adult fingers typically have a diameter of 16 mm to 20 mm. Some people may have larger or misshapen fingers. Therefore, the use of small connectors, such as the LC having a 1.25 mm diameter ferrule, may be especially problematic for technicians having larger or less dexterous hands. Commonly, LC connectors are held together in a duplex configuration with a plastic clip. While holding smaller sized connectors in a duplex configuration may make it easier for a technician to access and/or remove LC connectors, it also means that two connectors are necessarily affected by any given servicing procedure.

There is a continuing need for new devices and systems to facilitate accessing communication adapters and/or cables supported by communication patching devices and systems, as well as maintaining and organizing cables within such devices.

BRIEF SUMMARY

According to one aspect of the disclosure, a communication system includes a housing, a tray, and a guide arm. The tray has a plurality of ports, each having a rear face. The tray is movably engaged with the housing and has a first position substantially inside the housing and a second position substantially outside the housing. The guide arm has a first end pivotably attached to the tray between the plurality of ports and a rear of the housing. The guide arm has a second free end opposite the first end, and is adapted to rotate from a first rotational position in which the guide arm is substantially parallel to the rear of the housing to a second rotational position in which the free end points toward the rear of the housing. In an installed state of the communication system, a plurality of rear cables is respectively connected to the rear faces of the plurality of ports. A length of the guide arm is configured for coupling to the rear cables in the installed state of the communication system such that as the tray transitions from the first position to the second position, the rear cables, in all rotational positions of the guide arm, extend in a same direction that the free end of the guide arm points.

The communication system may include a cable sleeve having a first portion coupled to the guide arm and a second portion coupled to the rear of the housing, the cable sleeve adapted to retain the rear cables therein. The cable sleeve may be a split sleeve. The system may also include the rear cables. The rear cables may exit through an opening in the rear of the housing, the opening positioned on a first side of the housing. The first end of the guide arm may be positioned in alignment with the first side of the housing. The rear cables may be coupled to one or more connectors positioned on the rear of the housing. The plurality of ports may include outermost ports positioned on opposite sides of the tray and innermost ports positioned between the outermost ports, first rear cables of the rear cables coupled to the outermost ports having a length that is greater than a length of second rear cables of the rear cables coupled to the innermost ports. Each of the rear cables may be operatively coupled to a cable guide positioned at a medial-to-lateral center of the tray. The cable guide may be positioned distal to the plurality of ports and proximal to the guide arm. The tray may include a first pin on a first side of the tray and the guide arm may include an aperture adapted to accept the first pin therein. The tray may include a second pin on a second side of the tray opposite the first side of the tray, the aperture of the guide arm adapted to accept the second pin therein. The rear of the housing may be hingedly coupled to a side of the housing so that the rear of the housing is pivotable between a closed state and an open state in which opposing faces of the rear are accessible to a user.

According to another aspect of the disclosure, a communication system includes a tray, a housing, and a guide arm. The tray has a plurality of ports each having a rear face. The housing includes first and second slots each configured to slidingly receive the tray, the first slot being horizontally adjacent the second slot. The first slot extends from a medial portion of the housing to a first lateral end of the housing, and the second slot extends from the medial portion of the housing to a second lateral end of the housing. The guide arm includes a first end and a second free end opposite the first end. The tray includes a first connector on a first side of the tray and a second connector on a second side of the tray. The second side of the tray is opposite the first side of the tray. The first end of the guide arm is adapted to couple with the first connector such that, when the tray with the guide arm is in sliding engagement with the first slot, the free end of the guide arm is adapted to rotate toward the first lateral end of the housing as the tray slides out of the first slot. The first end of the guide arm is adapted to couple with the second connector such that when the tray with the guide arm is in sliding engagement with the second slot, the free end of the guide arm is adapted to rotate toward the second lateral end of the housing as the tray slides out of the second slot.

The first end of the guide arm may include an aperture. The first connector may be a first pin and the second connector may be a second pin, the first pin and the second pin each being adapted to engage the first end of the guide arm through the aperture. The system may further include a cable sleeve having a first portion coupled to the guide arm. The system may also include a plurality of rear cables, each of the rear cables adapted to couple to a corresponding rear face of one of the plurality of ports. The plurality of ports may include outermost ports positioned on opposite sides of the tray and innermost ports positioned between the outermost ports, first rear cables of the rear cables coupled to the outermost ports having a length that is greater than a length of second rear cables of the rear cables coupled to the innermost ports. Each of the rear cables may be operatively coupled to a cable guide positioned at a center of the tray between the first side of the tray and the second side of the tray.

BRIEF DESCRIPTION OF THE DRAWINGS

By way of description only, embodiments of the present disclosure will be described herein with reference to the accompanying drawings, in which.

DETAILED DESCRIPTION

Figure 1A:
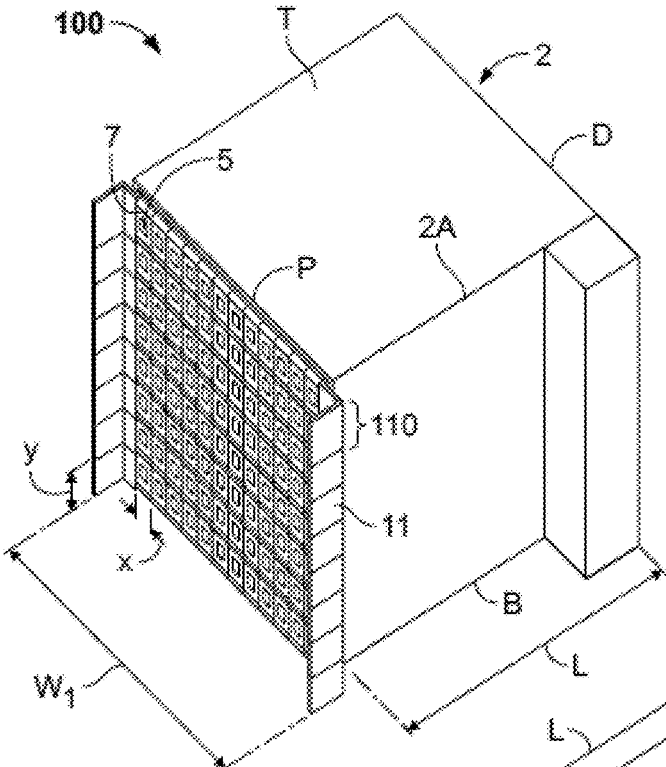
FIG. 1A is a front perspective view of a communication patching system including multiple patch panel devices shown in a first state.

Particular embodiments of the present disclosure are described with reference to the accompanying drawings. In the figures and in the description that follow, in which like reference numerals identify similar or identical elements, the term "proximal" refers to the end of the device that is closest to the operator or user during use, while the term "distal" refers to the end of the device that is farther from the operator or user during use.

Figure 1B:
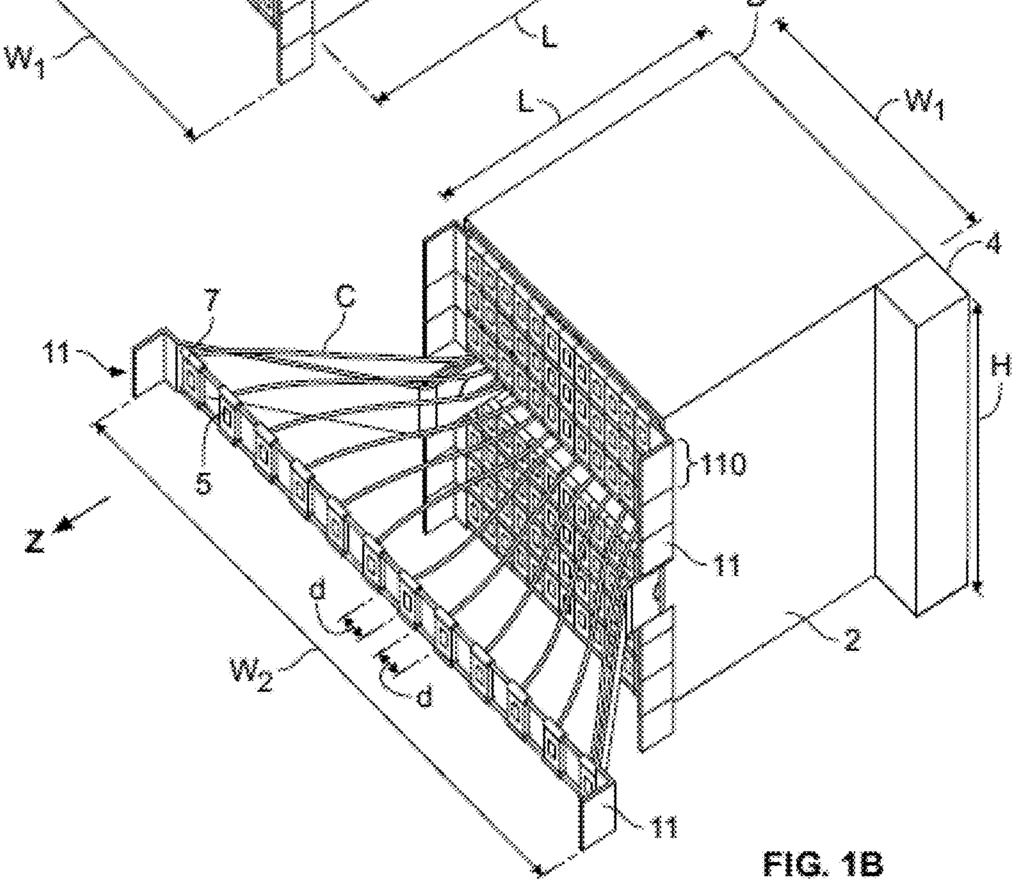
FIG. 1B is the communication patching system of FIG. 1A shown in a second state.
Figure 1C:
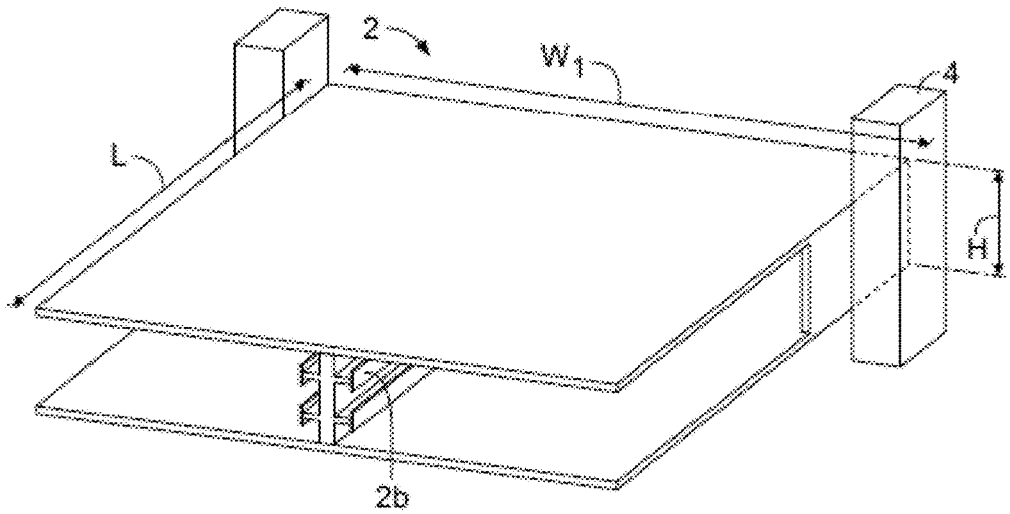
FIG. 1C is a front perspective view of a housing and cable trough, without a patch panel device placed therein.

Now referring to FIGS. 1A-C, a communication patching system 100 may include a housing 2, e.g., a rack or a cabinet. The housing 2 may define a length L, a height H, and a width $W_1$. The housing 2 may support one or more patch panel devices 110, with each device 110 held in vertical alignment with a guide rail 2*b* (FIG. 1C), a plurality of which may also be disposed in vertical alignment along at least one side of the housing 2. A cable trough 4 may be positioned adjacent to the housing 2, for example at a proximal corner, a distal corner, or intermediate the proximal and distal corners. The cable trough 4, which may be attached to the frame of the system 100 (which may include, e.g., poles, walls, and other supports), may be configured to receive therein a plurality of cables C extending vertically therethrough. The cable trough 4 may take any suitable form to house and guide cables including, for example, a plurality of guide rings, a groove or other hollow passageway.

Each patch panel device 110 may include a plurality of adapters or ports 7, each port 7 having a receptacle 5 for securing a cable C (FIG. 1B) therein. The receptacle 5 of the port 7 may be operatively coupled to one or more cables C, e.g., the receptacle 5 may be in a simplex or in a duplex configuration. The port 7 may include a mounting portion 51 that frames the port 7 and facilitates securing of the port 7, or the receptacle 5, to connection means, e.g., rails 41, 43 (FIG. 2C). In some embodiments, the mounting portion 51 of the port 7 may be integrally formed with the port 7 or may be a separate component coupled to the receptacle 5, and in some embodiments the mounting portion 51 may form a part of a connection means to which the receptacle 5 is connected, as described below.

The patch panel device 110 may include a tab 11 on either end of the patch panel device 110 to facilitate a user grasping or handling of the patch panel device 110. The density of the number of ports 7 supported by the housing 2 may be a function of the dimensions of the housing 2. As shown in FIG. 1A, the ports 7, each of which has a width x and a height y, may be arranged in rows and columns in which the number of rows of ports 7 is directly correlated to the height H and the number of columns of ports 7 is directly correlated to the width $W_1$.

The communication patching system 100 may be transitionable between a first state (FIG. 1A) and a second state (FIG. 1B). In the first state, the one or more patch panel devices 110 may be positioned at a first location with respect to the proximal end or face P of the housing 2. As shown in FIG. 1A, the patch panel devices 110 may be substantially flush with respect to the face P of the housing 2. In the second state, one or more of the patch panel devices 110 may be disposed proximally in the direction of arrow Z away from the proximal end or face P of the housing 2. As the patch panel device 110 is moved proximally, the ports 7 may be transitioned to be spaced apart from one another by a gap or spacing distance d (FIG. 1B).

Figure 2A:
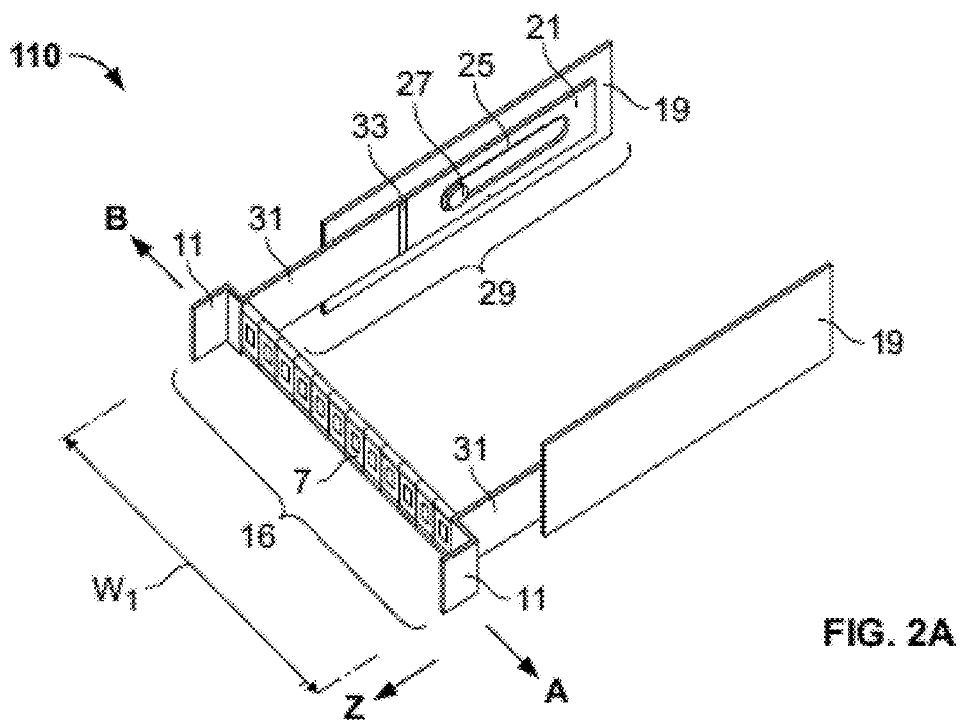
FIG. 2A is one of the patch panel devices of FIG. 1A shown in a first state.
Figure 2B:
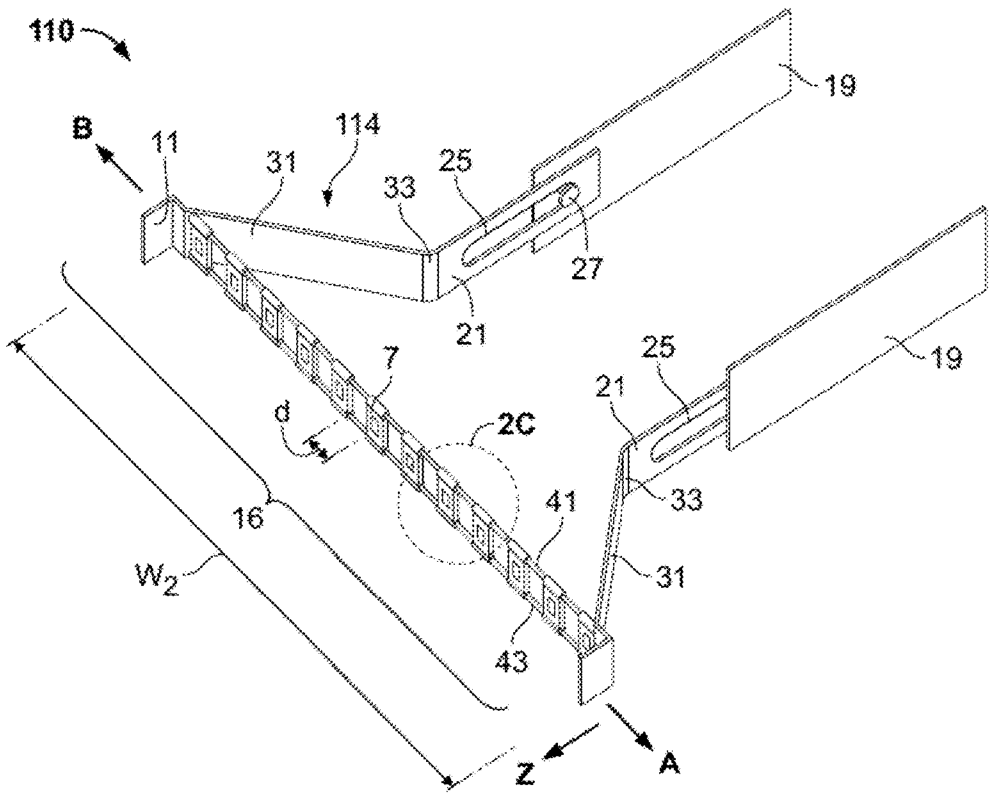
FIG. 2B is the patch panel device of FIG. 2A shown in a second state.
Figure 2C:
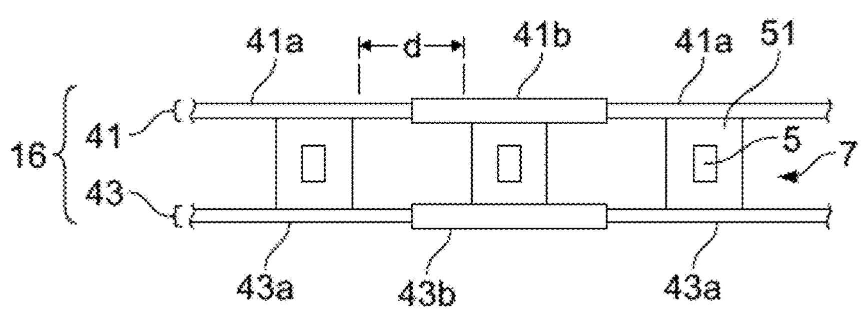
FIG. 2C is an enlarged view of the indicated area of FIG. 2B.

The patch panel device 110 may be transitionable between first and second states, as shown best in FIGS. 2A and 2B respectively. The patch panel device 110 may include bars 19, which facilitate mounting of the patch panel device within the housing 2 by securing one of the bars 19 on each of opposite sides 2*a* of the housing 2. A hinged arm member 114, which includes a first arm section 21 and a second arm section 31, may be slidably connected to the bar 19. The first arm section 21 may include a slot 25 which is configured and adapted to receive a pin 27 therethrough. The pin 27 may secure the first arm section 21 to the bar 19 while permitting the first arm section 21 to slide relative to the bar 19 along the length of slot 25. The first arm section 21 and the second arm section 31 of the hinged arm 114 may be pivotably connected to one another by a hinge 33, thereby facilitating the rotation of the second arm section 31 relative to the first arm section 21.

The ports 7 may be operably coupled to a connection means 16. As the connection means 16 transitions from a first length equal to width $W_1$ (FIG. 2A) to a second, expanded width $W_2$ (FIG. 2B), the ports 7 may move, or be moveable, to be positioned in a spaced apart relation. In an embodiment, the ports 7 are spaced apart. The ports 7 may be equidistantly spaced apart by equal gaps or spacing distances d. However, the spacing distances d between adjacent ports 7 may differ, i.e., be non-uniform, in the second state. In addition, individual ports 7 may be slid or moved along the length of the connection means 16, thereby facilitating adjustment of the gap or spacing distances d between adjacent ports 7 as desired by a user.

It is contemplated that the hinged arm member 114 may include a lip (not shown) that interacts with a groove (not shown) defined within the bar 19 along a portion or substantially the entire length of the bar 19 to provide added stability and controlled movement of the hinged arm member 114 relative to the bar 19.

As shown best in FIG. 2C, the connection means 16 may include one or more telescopic rails 41, 43 that are slidable to adjust the overall length of the connection means 16. Although shown in FIG. 2C as having two parallel rails 41, 43, a single rail may be used. It should be noted that the greater the overall length of the connection means 16, the greater the gap or spacing distance d achievable between adjacent ports 7. Each of the parallel rails 41, 43 may include alternating sections 41*a*, 41*b* and 43*a*, 43*b* respectively. Sections 41*a*, 43*a* may be configured and adapted to slide within sections 41*b*, 43*b* respectively, where the ports 7 may be coupled to the sections 41*b*, 43*b*, to effect lengthening or shortening of the connections means 16. A resilient or biasing member (not shown) may be placed within a hollowed out center of each of the rails 41, 43 to bias the connection means 16 to one of the first or second dimensions $W_1$, $W_2$, respectively.

The sections 41*b*, 43*b* may define an open circumference such that the ports 7 will not obstruct movement of the alternating sections 41*a*, 41*b* and 43*a*, 43*b* relative to one another such that the ports 7 may be moved in closer proximity to one another. In addition, the lengths of the alternating sections 41*a*, 41*b* and 43*a*, 43*b* may be selected to facilitate placement of the ports 7 in close proximity to one another, such that adjacent ports contact each other. Each port 7 may be secured to the rails 41, 43 in a variety of ways or may be integrally formed with the rails 41, 43. It is contemplated that in other embodiments, the rails 41, 43 may be substituted with different connection means. In an embodiment, the rails 41, 43 may be substituted with elastic bands. A variety of other configurations may be used to effect lateral, angular, or other spacing between ports in a patch panel device to increase access to the ports, such as those described in greater detail in U.S. Patent Publication Nos. 2014/0355217, 2014/0357118, and 2014/0354131, the disclosures of which are hereby incorporated by reference herein.

For example, another embodiment of a patch panel device is described with reference to FIGS. 3A-3D. A patch panel device 210 may include a plurality of attachment members 232 that are positioned adjacent to one another. Each attachment member 232 may include a movable member 246, which is rotatable or pivotable relative to a movable member of another attachment member 232. The movable members 246 of adjacent members 232 may be operatively coupled to one another to permit rotation of one of the movable members 246 relative to the other movable member. In an embodiment, the movable members 246 may be coupled to one another in a snap-fit connection that permits radial movement of the movable members 246 relative to one another. At least two securement members 244 may be secured to opposing ends of the plurality of attachment members 232 and secure the attachment members 232 to a tray 231. In another embodiment, a securement member 244 may be positioned between each of the movable members 246. Each of the movable members 246 may be operatively coupled to one or more cables C1, which are shown only in part. The movable member 246 may include a cable adapter or connector 249, which may include a front surface 249*a* that may be operatively coupled to one cable C1 and a back surface 249*b* that may be operatively coupled to another cable C1. The movable member 246 may include a receptacle 247 in which the connector 249 may be releasably secured such that the connector 249 may be separated from the attachment member 232.

The movable members 246 may be positioned spaced a distance from an edge 231*a* of the tray 231 to permit the movable members 246 to rotate relative to the tray 231. In one embodiment, the tray 231 may include a cut-out (not shown) at the movable members 246 to facilitate a range of movement of the movable members 246 relative to the tray 231. The tray 231 may have an axis z extending along its length, an axis y extending along its height, and an axis x extending its width. The securement member 244 may be coaxially aligned with the axis z extending along the length of the tray 231. A plurality of securement members 244 may be positioned in a row extending along axis x along the width of the tray 231.

Figure 3A:
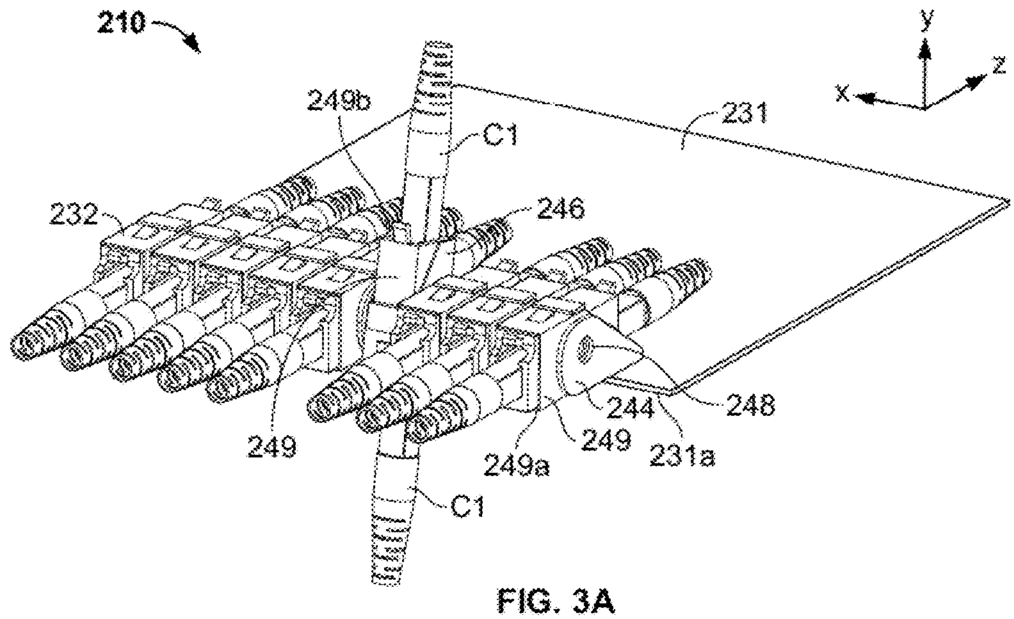
FIG. 3A is a perspective view of another embodiment of a patch panel device including a plurality of attachment members.
Figure 3B:
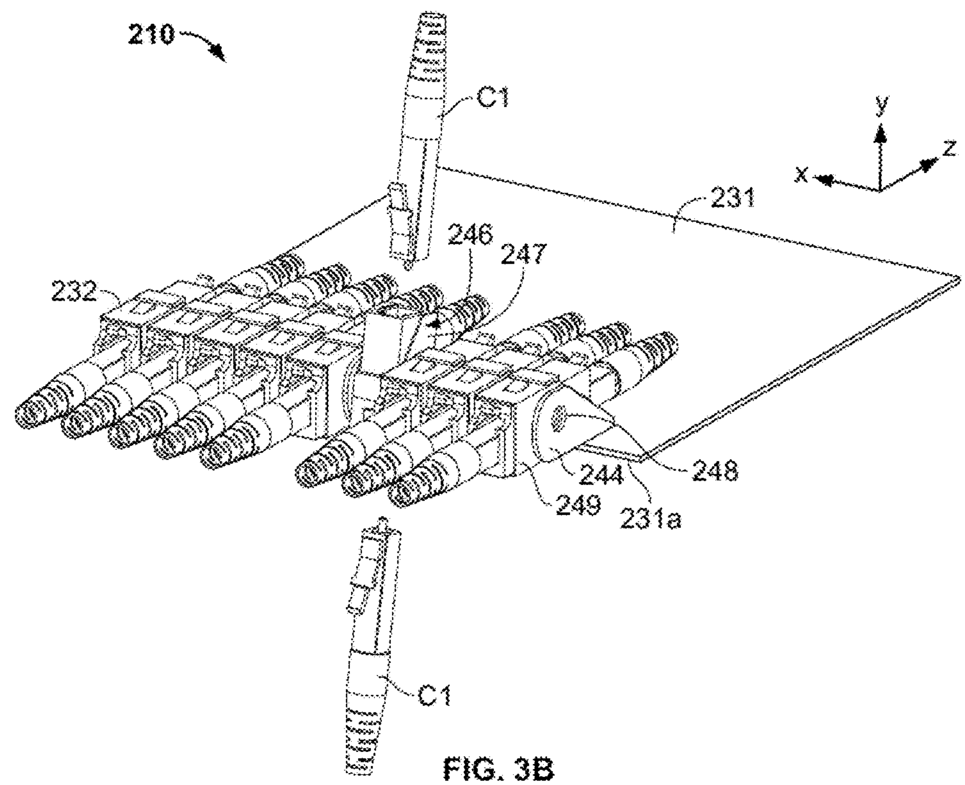
FIG. 3B is a perspective view of the patch panel device of FIG. 3A in which cables have been separated from one of the attachment members.
Figure 3C:
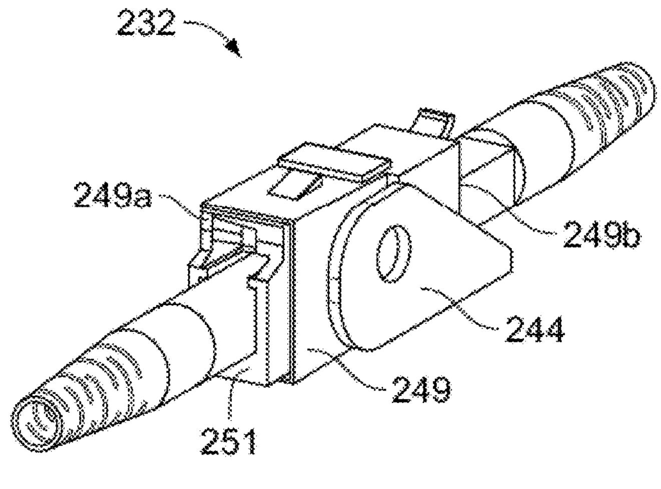
FIG. 3C is a perspective view of one of the attachment members of FIG. 3A shown in a first condition.
Figure 3D:
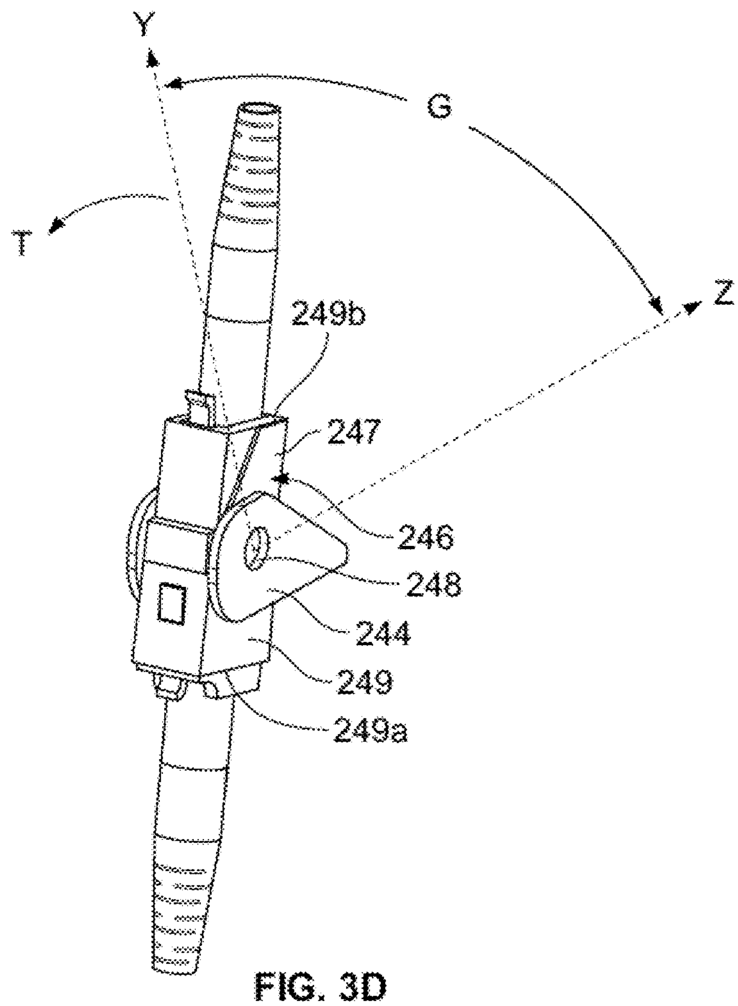
FIG. 3D is a perspective view of one of the attachment members of FIG. 3A shown in a second condition.

As shown in FIGS. 3C-3D, the securement member 244 and a movable member 246 of the attachment member 232 may be pivotably connected to one another at a pivot point 248 such that the movable member 246 may be radially moved relative to the securement member 244 to define an angle G therebetween. In particular, the movable member 246 may radially pivot between the y and z axes and the angle G may be defined therebetween. When secured to the tray 231, the movable member 246 may pivot in a counter-clockwise direction T, but may be inhibited from pivoting in the opposite, clockwise direction by the tray 231. However, as discussed above, cut-outs in the tray 231 may reduce the interaction between the tray 231 and the movable member 246 to facilitate a greater range of movement of the movable member 246 with respect to the tray 231. In an embodiment, the angle G may be adjusted within a range between about 0 and about 135 degrees. In another embodiment, the angle G may be adjusted within a range between about 0 and about 90 degrees. For example, in one embodiment, the movable members 246 may be movable relative to one another to transition the patch panel device 210 between a first condition in which front surfaces 251 of the movable members 246 are substantially coplanar, and adjacent ones of the members 246 are spaced apart a first distance or contact each other, and a second condition in which the front surfaces 251 of respective adjacent members 246 are in different planes in accordance with the angle G that one of the adjacent members 246 is pivoted or rotated relative to the other adjacent members 246, where the other member 246 may or may not be at the same position as in the first condition.

A plurality of patch panel devices 210 may also be supported within housing (see FIGS. 1A-C), and may be translatable into or out from the housing 2 in a direction along axis z. Once spaced apart from the housing 2, the movable member 246 may be pivoted with respect to the securement member 244, thereby spacing the surfaces 249*a*, 249*b* of the connector 249 from any adjacent connector 249 such that the cables C1 may be more accessible and readily grasped by a user to detach the cable C1 from the cable adapter or connector 249 of the movable member 246 (as shown in FIG. 3B).

As noted above in connection with FIGS. 1A-C, a number of cables C may be coupled to ports 7 of a particular patch panel device, with the cables C extending vertically through cable trough 4. A number of systems for routing and managing cables C of patch panel systems are described below.

One embodiment of a front cable management system 300 is shown in FIGS. 4A-D. Cable management system 300, as well as other embodiments of cable managements systems described herein, may be used with any suitable patch panel device, including suitable devices described herein and suitable devices described in U.S. Patent Publication Nos. 2014/0355217, 2014/0357118, and 2014/0354131, the disclosures of which are hereby incorporated by reference herein. Cable management system 300 is illustrated in FIGS. 4A-D as being used with a patch panel device 310 similar to patch panel device 210, with certain differences described in greater detail below. The cable management system 300 may include one or more cable guides 400 having a fixed position in relation to housing 2. In the embodiment shown in FIGS. 4A-D, cable management system 300 includes cable guides 400 mounted to each side of housing 2, although any configuration in which one or more cable guides 400 have a fixed position relative to housing 2 may be suitable. Cables C may be routed from ports 7, through or via cable guide 400, and to cable trough 4 (or any other suitable cable destination) so that as a tray 331 to which ports 7 are attached is pulled out of housing 2, a suitable amount of slack is maintained in cables C at different positions of tray 331. Cable guides 400 are described in greater detail in U.S. patent application Ser. No. 15/270,234, the disclosure of which is hereby incorporated by reference herein.

Figure 4A:
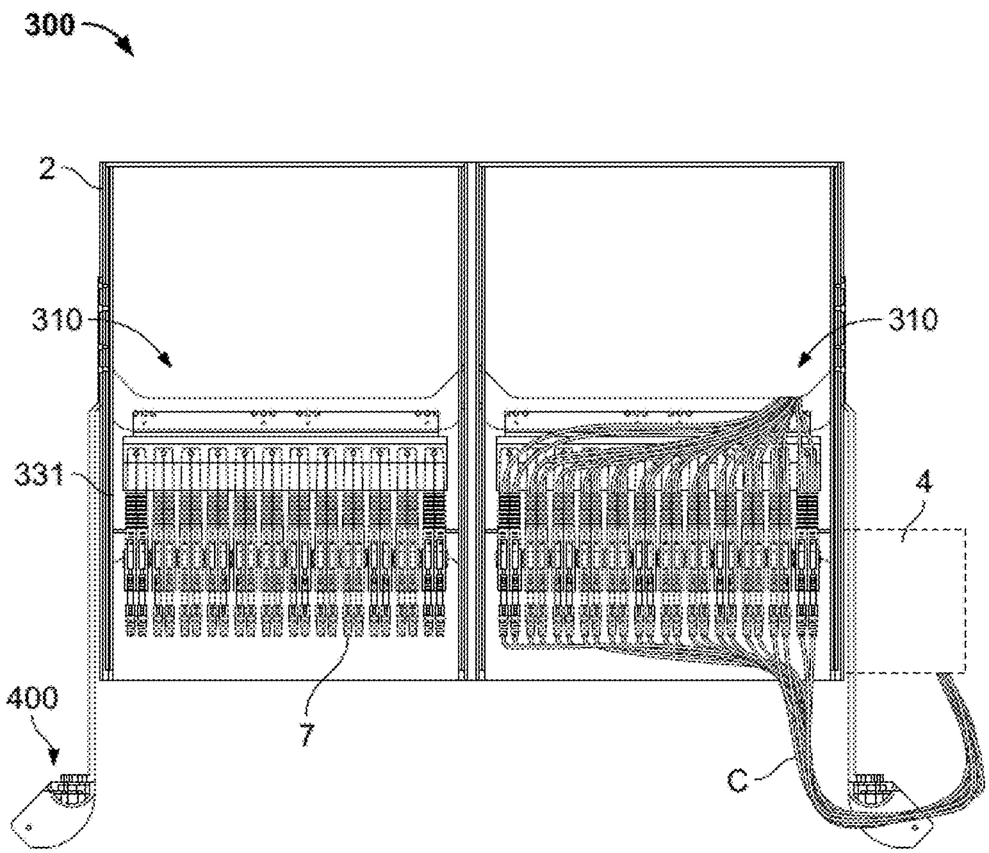
FIGS. 4A-C are top cutaway views of a cable management system having a cable guide in different states of operation.

FIG. 4A illustrates a top cutaway view of cable management system 300, including a housing 2 having a first plurality of trays 331 stacked vertically adjacent a second plurality of trays 331 stacked vertically (only one tray 331 from each group visible in FIG. 4A). The trays 331 are shown in FIG. 4A in an installed or stored position in which the trays 331 are fully or substantially fully positioned within housing 2. The trays 331 are slidable with respect to housing 2 so that, when in a pulled out condition, as shown in the right tray 331 in FIG. 4B, the ports 7 are more easily accessible to a user. In the embodiment shown in FIGS. 4A-D, the ports 7 are pivotally connected to tray 331 at a rear portion of the port 7 so that the ports 7 may swing side-to-side with respect to one another (see FIG. 4C) to create additional space when the tray is in the pulled out position. One set of cables C is connected to front or proximal ends of ports 7 and routed through cable guide 400 into cable trough 4. Patch panel systems having pivoting ports are described in greater detail in U.S. Pat. No. 8,939,792, the disclosure of which is hereby incorporated by reference herein.

Each port 7 may include a front cable C coupled to the front end and a rear cable C coupled to the rear end. In the embodiment shown in FIGS. 4A-D, a front set of cables is coupled to the proximal end of ports 7 and passed through cable guide 400 and into cable trough 4. A rear set of cables C is coupled to the distal end of ports 7 and passed into a rear portion of housing 2. These rear cables C may be connected to electronic components in a module in the rear of housing 2, to a connector in the rear wall of housing 2 that provides a connection to other cables outside the housing, or they may be passed through an opening in the back of housing 2. Cable management systems for these and similar rear cables are described in greater detail below in connection with FIGS. 5A-8.

Generally, when cables are attached to ports on a sliding tray in a patch panel communication type system, management of cables near the front or proximal side of the system may become difficult. For example, for cables coupled to a front of a set of ports, as the tray is moved from the stored position to a pulled out position, slack in the front cables increases from a minimum to a maximum. When the tray is at a position in which the cables have a maximum slack, if there is too much slack, the likelihood that the cables get caught on or otherwise interfere with components of the system may be increased. Further, too much slack may make it more difficult to manipulate the cables when the tray is in the pulled out position. Too little slack may also complicate the ability to manipulate the cables, for example by limiting the ability of ports to move away from one another, and may otherwise increase the risk of detrimental stresses being placed on the cables. As is described in greater detail below, cable management system 300, in combination with cable guide 400, may provide cable management, including slack management, in a simple and effective fashion.

Figure 4B:
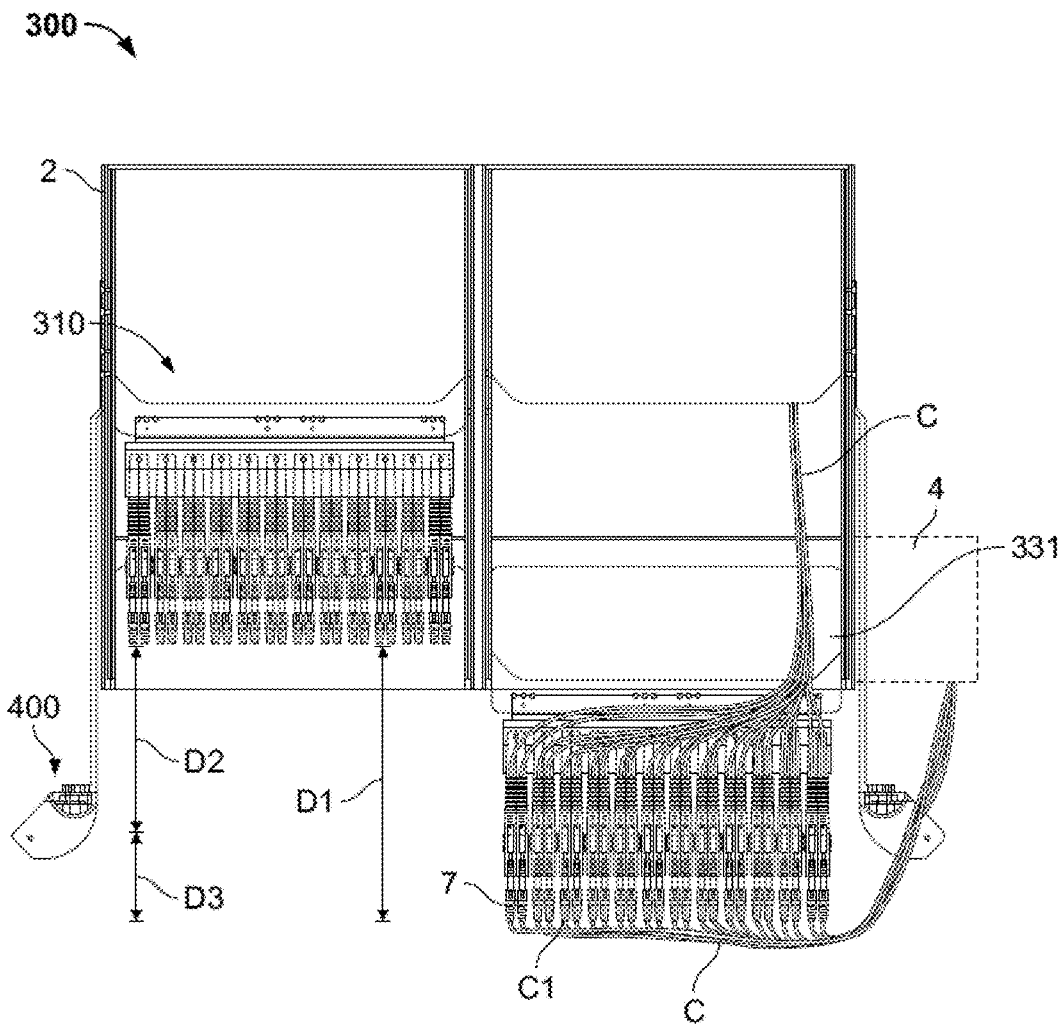
Figure 4C:
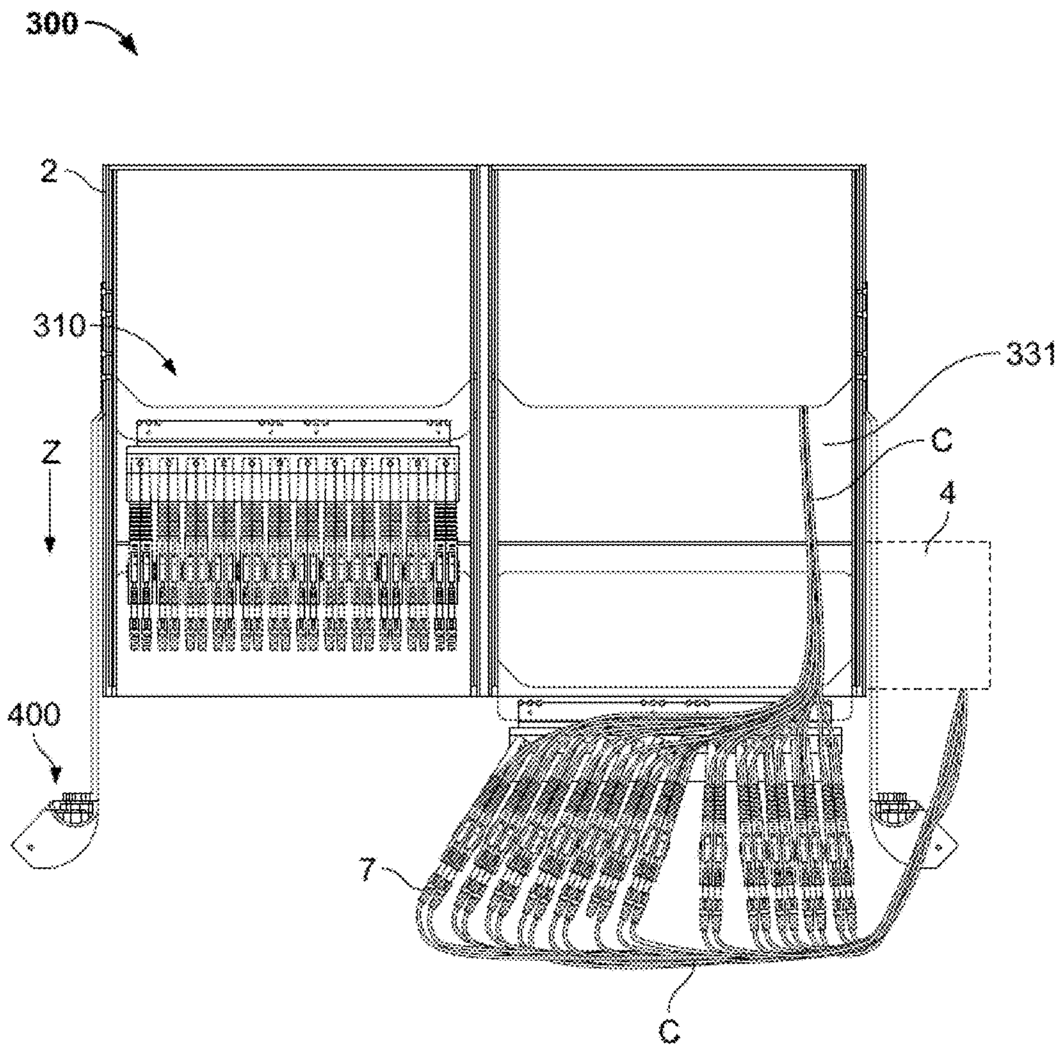
Figure 4D:
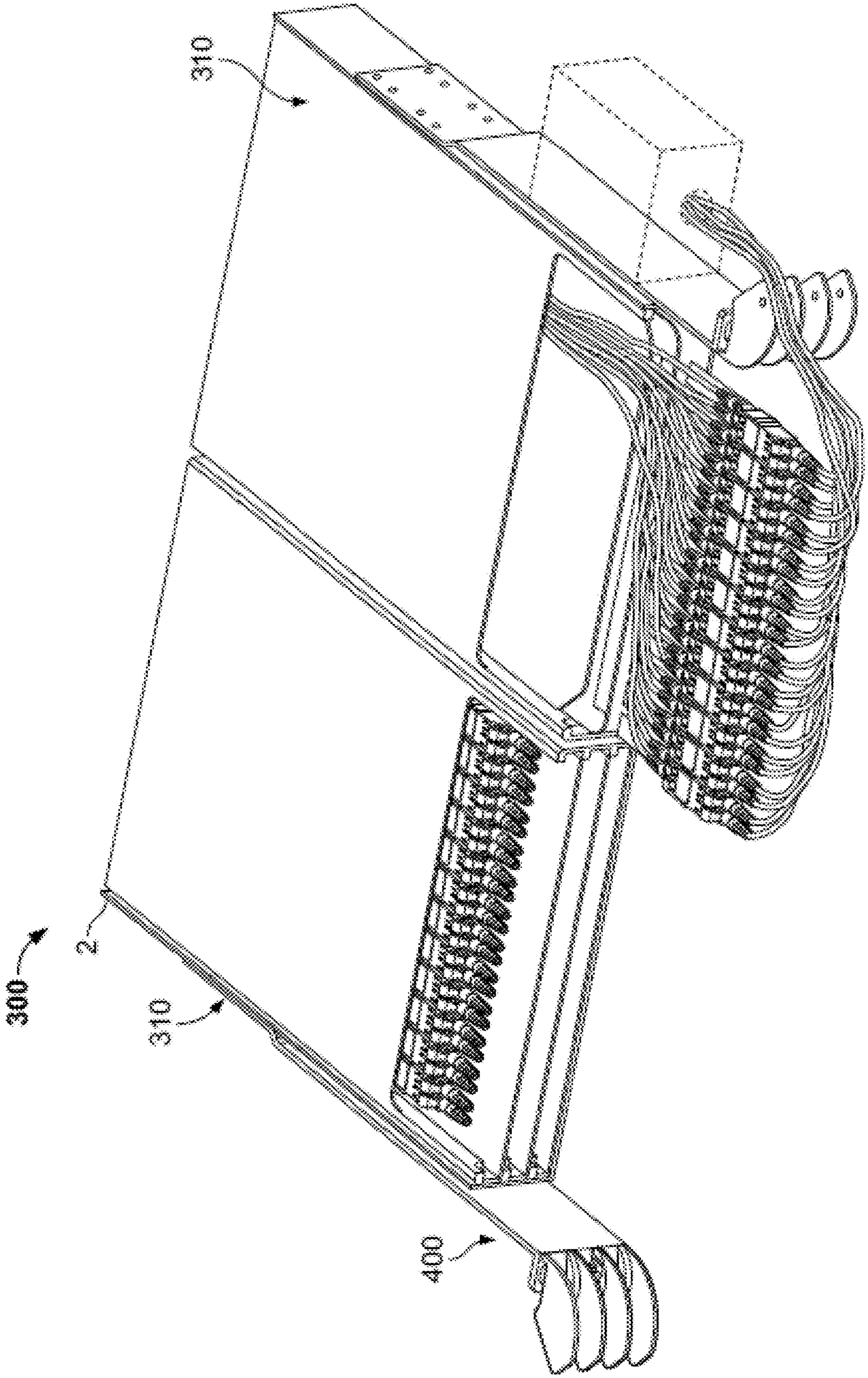
FIG. 4D is a perspective view of the cable management system of FIGS. 4A-C.

As shown in FIGS. 4B-C, ports 7 have a maximum slidable distance in the Z direction of D1, representing the distance between the stored position, represented by the left tray 331 in FIG. 4B, and the pulled out position, represented by the right tray 331 in FIG. 4B. Shelves of cable guide 400 are positioned lateral to the lateral-most port 7. In addition, the shelves may be positioned a distance D2 in the Z direction from the proximal end of ports 7 when tray 331 is in the stored position, and a distance D3 in the Z direction from the proximal end of ports 7 when tray 331 is in the pulled out position. In the illustrated system 300, the distance D2 is greater than the distance D3, with the sum of distances D2 and D3 being equal to the distance D1. With this configuration, front cables C may be managed in the system 300 where the front cables C are connected at one end C1 to a front of the ports 7, and each of the front cables is supported by the cable guide 400 at the shelves at a portion of the front cable a predetermined length of the front cable from the one end C1. In such cable connection arrangement, the slack in front cables C increases as tray 331 is pulled out until the tray 331 travels the distance D2, where the proximal ends of ports 7 are transversely aligned with the shelves of cable guide 400. At this point, the slack in the cables is at a maximum, as the cables remain supported at the cable guide at the portions that are respectively predetermined lengths from the ends C1. As a user continues to pull tray 331 further proximally to the completely retracted position represented by the right tray 331 in FIG. 4B, the slack begins to decrease as the cables become tauter, the cables again remain supported at the cable guide 400 at the portions that are respectively predetermined lengths from the ends C1. It should be understood that in other examples, the cable guide 400 may be positioned a different distance in the Z direction. For example, the shelves of the cable guide 400 may be positioned proximal to the front face of ports 7 when the tray 331 is in the stored position as well as in the pulled out position.

In the configuration illustrated in FIGS. 4A-D, there is more slack in front cables C when the tray 331 is in the pulled out position than when the tray 331 is in the stored position. When tray 331 is in the stored position, front cables C are generally not manipulated since the ports 7 are within, or flush with the front of, housing 2. Because the front cables C are generally not manipulated when the tray 331 is in the stored position, the front cables C can be relatively taut to help maintain the cables C in an organized fashion. On the other hand, if a user intends to manipulate front cables C, he or she may generally transition tray 331 into the pulled out position. Further, when in the pulled out position, the ports 7 are capable of moving laterally apart (and/or vertically apart in a system similar to the patch panel device 210 of FIG. 3A) with respect to one another to provide the user better access to the ports 7, as shown in FIG. 4C. For these reasons, it is desirable for at least some slack to remain in the front cables C when the tray 331 is in the pulled out condition. However, the slack is desirably the minimum amount to allow for the motion of ports 7 and manipulation of front cables C. Thus, it is desirable that the slack in the front cables C is not at a maximum when in the tray 331 is in the pulled out position. It is noted that in the pulled out position of the tray, when one of the ports 7 is manipulated from a normal position such as shown on the left tray of FIG. 4B, the one front cable C connected thereto may move such that the portion of the one front cable C is not positioned at, and therefore not supported by, the cable guide. However, when the port 7 is returned to a normal position, the portion of the one front cable C connected thereto may return to a state at which the portion of the one front cable C is positioned at, and supported by, the cable guide. Each of the conditions described above is met with the cable management system 300 and cable guides 400 illustrated in FIGS. 4A-C. It should further be understood that effective cable management may still be provided when the cable guide 400 is positioned differently. For example, even if the shelves of cable guide 400 are positioned proximal to the front face of ports 7 in all positions of tray 331, slack management and cable organization may be provided in an effective and relatively simple fashion. With that configuration, cables C may have maximum slack when tray 331 is in the pulled out position, which maximum slack is desirably enough to manipulate cables C at ports 7, with the slack reducing as tray 331 is pushed into the stored position. The configuration described in connection with FIGS. 4A-D may also help limit or eliminate movement of the cables C within the cable trough 4, and also between cable guide 400 and the cable trough 4, during movement of the tray 331.

Figure 5A:
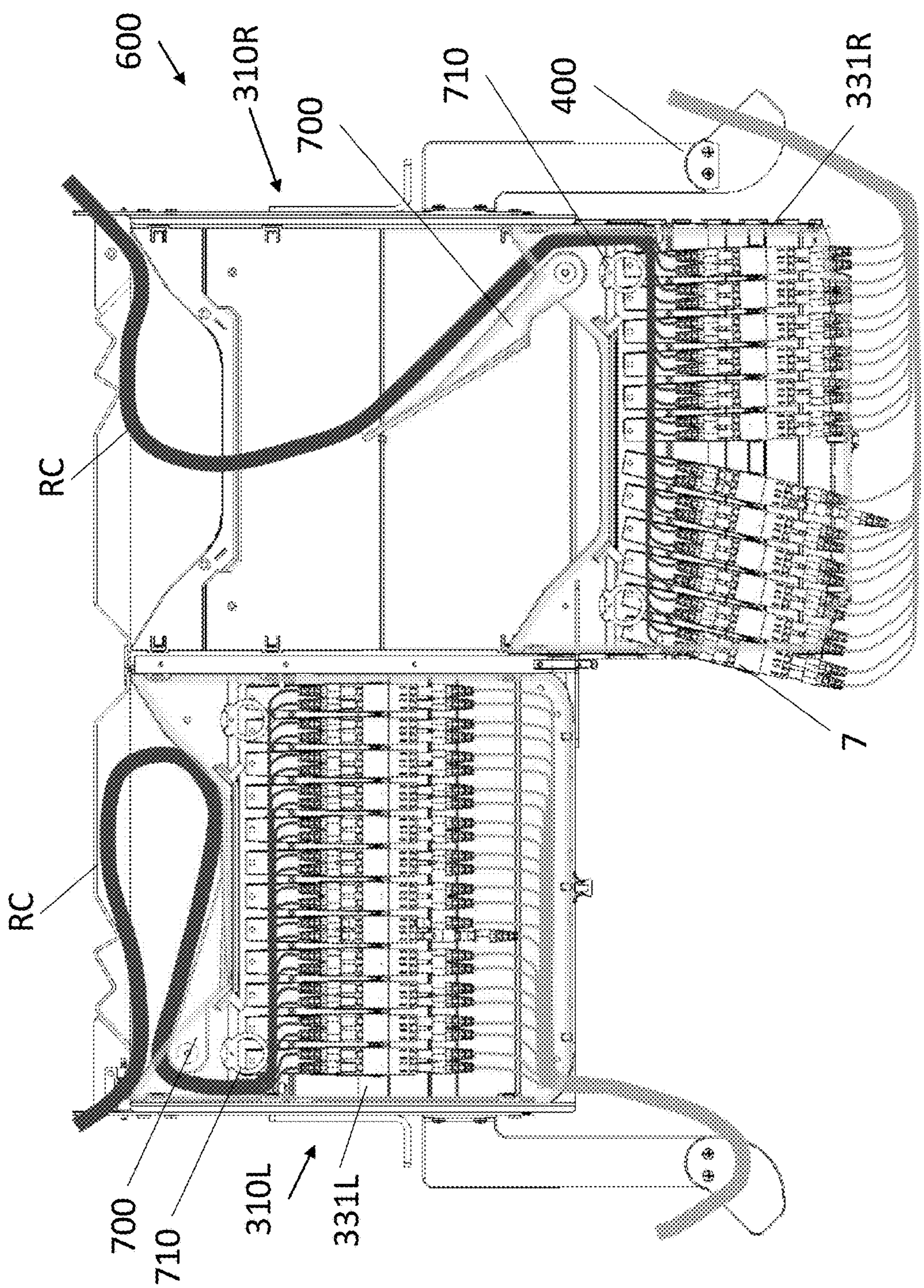
FIG. 5A is a top cutaway view of a cable management system having a rear cable guide in different states of operation.

As noted above, in addition to managing cables at the front or proximal side of a patch panel device, it may be preferable to manage cables extending to and through the rear of the patch panel device. FIG. 5A illustrates an embodiment of a cable management system 600, which may include a tray 331L on a left side of the housing and a tray 331R on a right side of the housing. It should be understood that, even though individual trays 331L, 331R are shown in FIG. 5A, in practice a plurality of the trays may be positioned in a vertically stacked configuration. Cable management system 600 may include some or all of the features of cable management system elements to manage cables at the front of the system, for example including cable guides 400, to help manage cables extending from the front of ports 7. Cable management system 600 also includes features to manage rear cables RC extending from the rear of ports 7. It should be understood that the features described below for rear cable management may be provided with, or without, features to manage front cables extending from the front of ports 7.

In the embodiment of cable management system 600 shown in FIG. 5A, which is in an installed state of the system 600, a plurality or rear cables RC may extend from the rear of ports 7. Each rear cable RC may be guided to one side of the particular tray, and pass from the rear of the tray to a rear of the patch panel device. In this example, rear cables RC of tray 331R are each guided to a right side of the rear of tray 331R toward a right side of the rear of patch panel device 310R. Similarly, rear cables RC of tray 331L are each guided to a left side of the rear tray 331L toward a left side of the rear of patch panel device 310L. When used in reference to rear cable management systems, the term medial refers to a position closer to the midline between patch panel devices 310L and 310R, while the term lateral refers to a position farther away from that midline. In other words, the rear cables for each patch panel device 310L and 310R are guided to a lateral side of the corresponding trays 331L and 331R, and may exit the rear of the housing at corresponding lateral sides.

Still referring to FIG. 5A, cable management system 600 may include guiding arms 700 to guide the position of rear cables RC. In particular, a first arm 700 may be coupled to a rear lateral portion of tray 331R, and a second arm 700 may be coupled to a rear lateral portion of tray 331L. Each guide arm 700 may be pivotably coupled to the corresponding tray, for example by a pin or other member, so that the guide arm may rotate with respect to the tray. The rear cables RC may extend beyond the rear of the corresponding tray and be in contact with the respective guide arm 700. Tray 331L is illustrated in the stored condition in FIG. 5A. In the stored condition, guide arm 700 may extend substantially parallel to a proximal face of the tray 331L. In this position, rear cables RC may extend along arm 700 medially, and then curve back and extend laterally toward the lateral side of the rear of patch panel device 310L, where they exit the housing. Tray 331R is illustrated in the pulled out or operative condition in FIG. 5A. In transitioning of the tray 331R from the stored position to the pulled out condition, guide arm 700 pivots about its connection to tray 331R and the guide arm extends so that its free end points toward the rear of the housing. A portion of the rear cables RC may be directly or operatively coupled to a portion of guide arm 700 so that, in all rotational positions of the guide arm, the rear cables RC extend in the same direction that the free end of the guide arm points. In some embodiments, the guide arms 700 may be biased toward either the rotational position shown for patch panel device 310L in FIG. 5A, or the rotational position shown for patch panel device 310R in FIG. 5A. However, the guide arms 700 may also be free or substantially free to rotate about the pivotable connection to the corresponding tray 331L, 331R. It should further be understood that the rear cables RC may be preferably configured so that, in the areas extending from the rear of the corresponding tray, the cables generally move with one another. For example, the rear cables RC may be bundled together, for example with one or more ties, or in a sleeve such as a split sleeve. Split sleeves are described in greater detail in U.S. Patent Publication No. 2016/0375567, the disclosure of which is hereby incorporated by reference herein. In some cases, the rear cables RC may have sufficient stiffness such that in the region between the rear of the tray and the rear of the patch panel device the cables RC extend with little or no sag and, therefore, no additional support for the cables RC is needed to avoid cable sag in such region.

In addition to guide arms 700, the rear of trays 331L and 331R may include other guide structures to help guide the individual rear cables RC extending from the rear of each port 7 to the respective guide arm 700. In the illustrated embodiment, round supports 710 are provided on the lateral sides near the rear of each tray 331L, 331R, so that the individual cables may be guided along the sides of the round supports, preferably while maintaining a minimum bending radius, and then to the respective guide arm 700. Supports 710 may be provided on both the medial and lateral sides of each tray 331L, 331R, so that tray 331R may also be positioned installed at the left side of the housing, and tray 331L may also be positioned installed at the right side of the housing, as discussed in greater detail below.

Figure 5B:
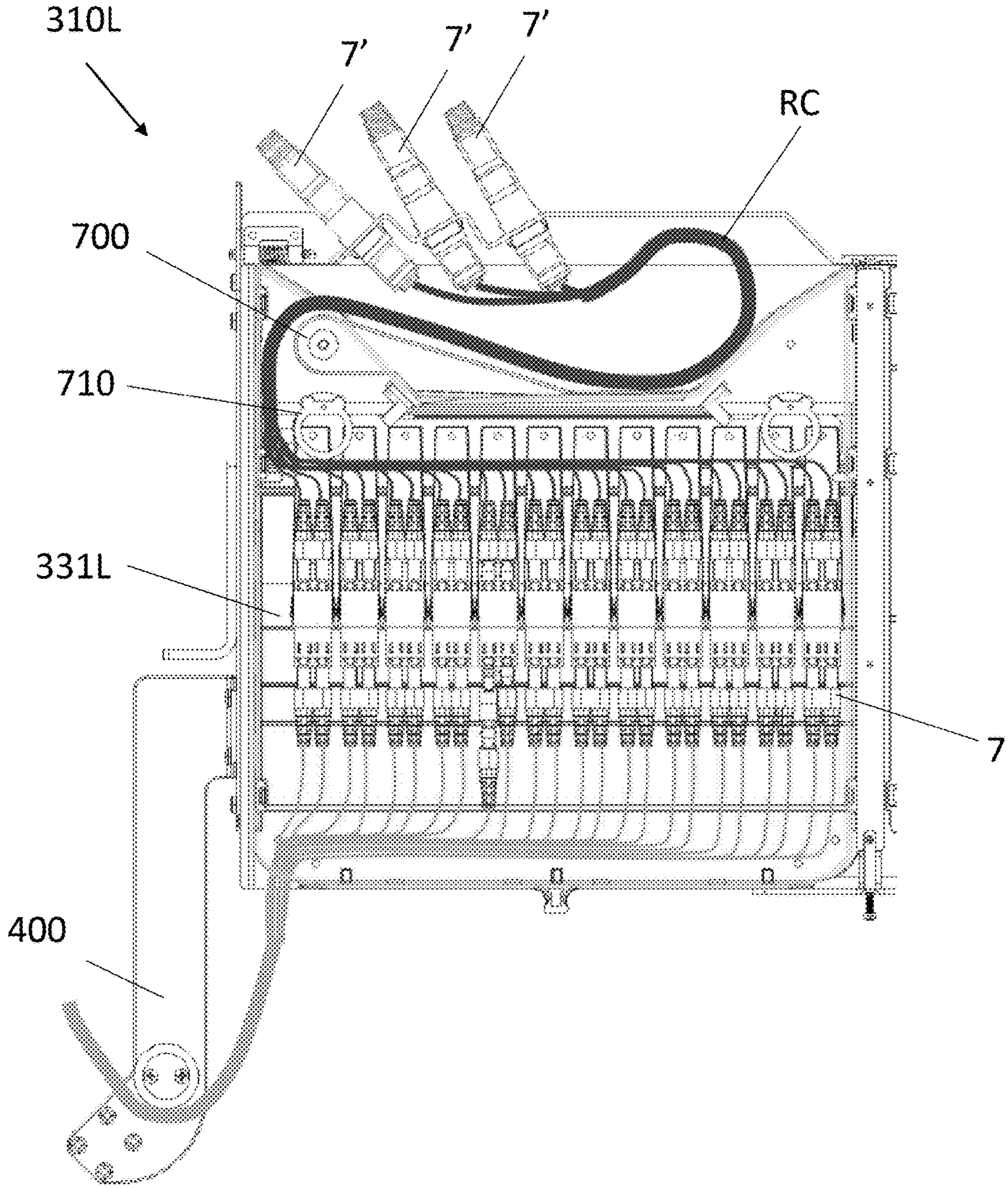
FIG. 5B is an enlarged view of a portion of another embodiment of a cable management system having a rear cable guide.

FIG. 5B illustrates an enlarged view of the left patch panel device 310L of FIG. 5A. It should be understood that the rear cables RC may actually exit the rear of the housing of the patch panel device, or alternatively connect to any desired connector at the rear of the housing. For example, as shown in FIG. 5B, rear cables RC may be bundled together for much of the distance between the rear of tray 331L and the rear of patch panel device 310L, but may separate to connect to one or more individual connectors 7' positioned near the rear of the housing.

Figure 5C:
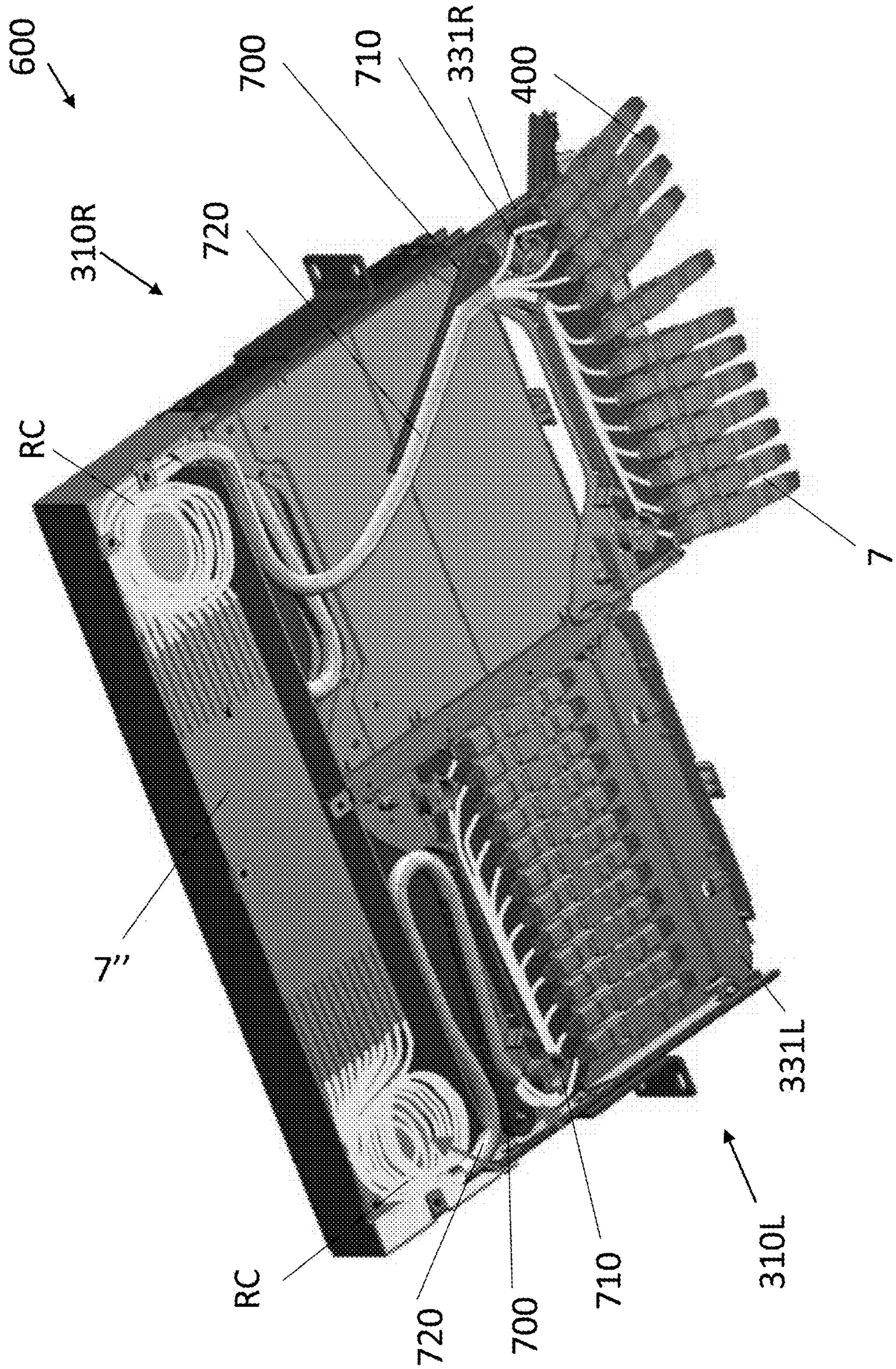
FIG. 5C is a top cutaway view of the cable management system of FIG. 5A with a housing extension member.

FIG. 5C illustrates cable management system 600 with an additional connector module 7" in a housing extension attached to the rear of the housing so that the rear cables RC may exit the housing at the rear lateral sides of the patch panel devices 310L, 310R and into the housing extension so that the rear cables RC may attach to the connector module 7" as desired. FIG. 5C also provides a better view of cable sleeves 720 that may be used to assist in guiding and managing the rear cables RC. Cable sleeves 720 may be continuous tubes or split sleeves. Split cable sleeves 720 may include a slit running longitudinally along the length of the sleeve so that the sleeve may be wrapped around the rear cables RC, as opposed to sliding the cables through a tube without a slit. If a sleeve 720 is utilized, it may be preferable that at least a portion of the sleeve is fixed along some length of the arm 700, for example by adhesives, hook-and-loop fasteners, or by any other suitable means. With this configuration, the sleeve 720, along with rear cables RC supported within the sleeve, may move together with the corresponding arm 720 while the arm 720 rotates upon movement of the corresponding tray into or out of the housing. Similarly, it may also be preferable to couple a portion of sleeve 700 to the rear of the housing adjacent the point at which the rear cables RC exit the housing (either directly or via a rear connector).

In the embodiments of cable management system 600 illustrated in FIGS. 5A-C, the individual rear cables RC may each have a different length. For example, referring to FIG. 5C, the rear cable RC at the left-most (or medial-most) connector 7 of tray 331R may need to be the longest of the rear cables, with the rear cable at the right-most (or lateral-most) connector of tray 331R needing to be the shortest. This configuration may be due to the pathway that the rear cables RC take prior to coming together at the point where guide arm 700 connects to tray 331R. However, in other embodiments, the rear cables RC may have different lengths which may provide additional benefits, described in greater detail below.

Figure 6A:
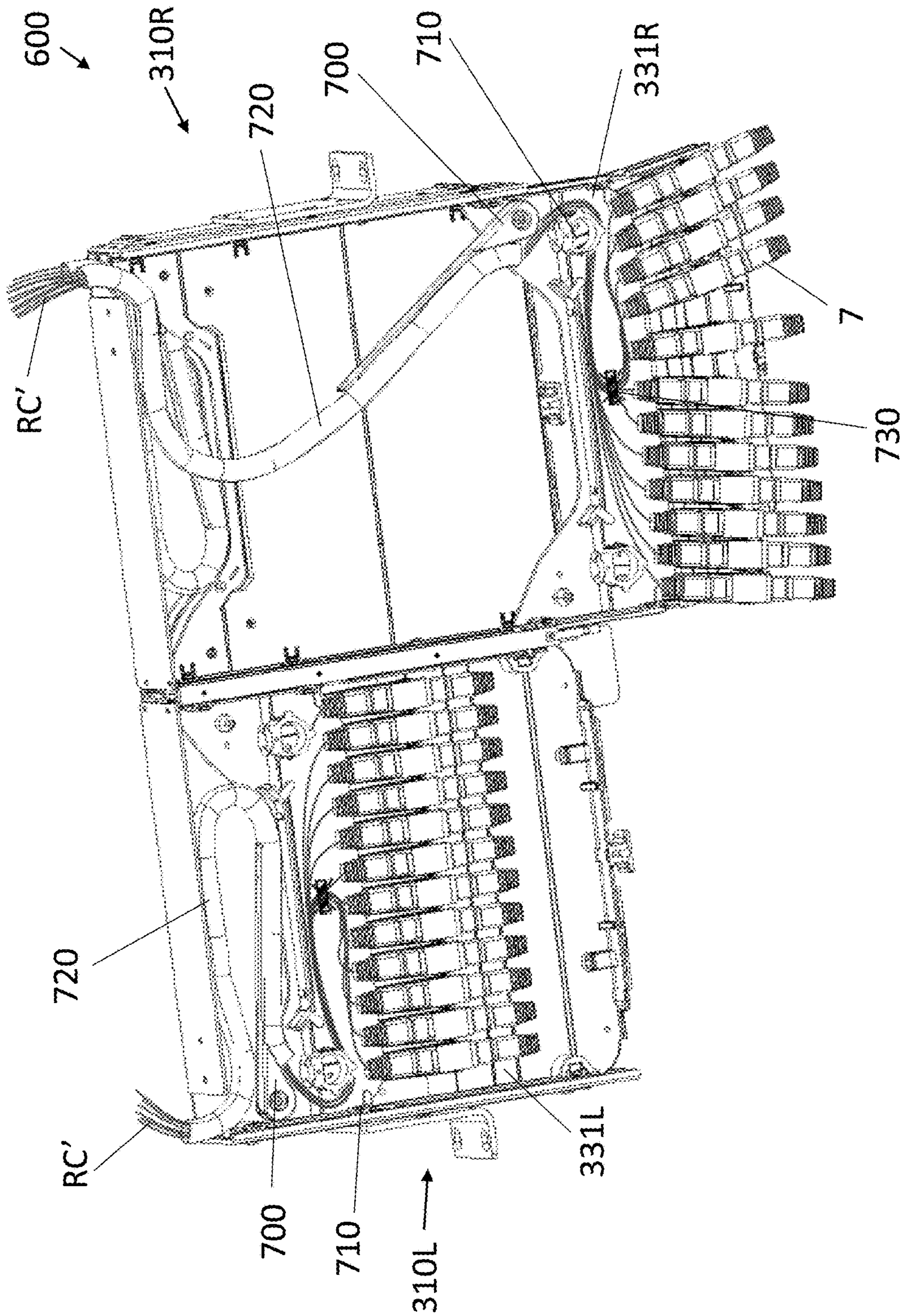
FIG. 6A is a top cutaway view of the cable management system of FIG. 5A with rear cables having a staggered length configuration.
Figure 6B:
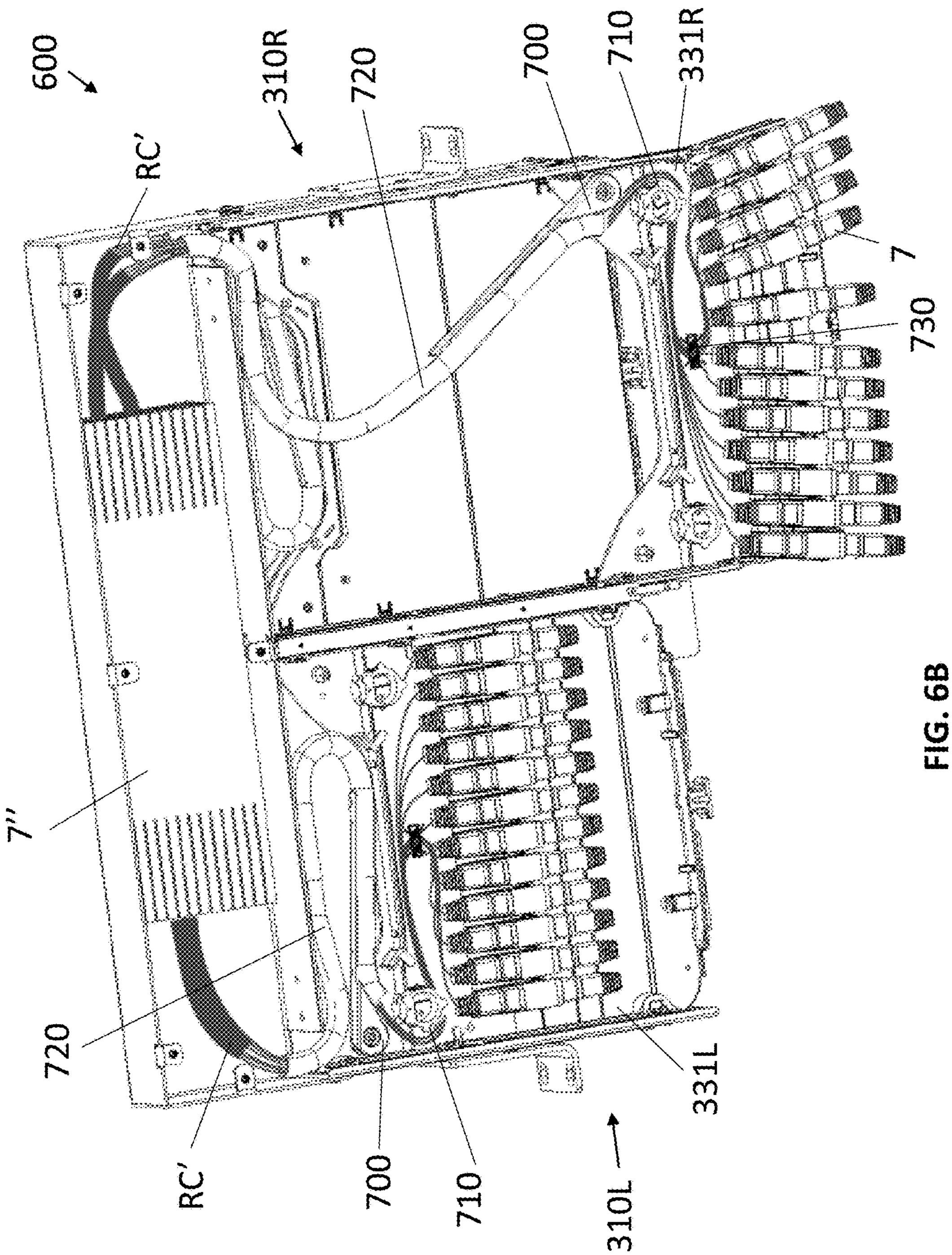
FIG. 6B is a top cutaway view of the cable management system of FIG. 5C with rear cables having the staggered length configuration.

FIG. 6A illustrates the cable management system 600 of FIG. 5A with rear cables RC' having a staggered length configuration. FIG. 6B illustrates cable management system 600 with additional module 7", which may be the same as that shown in FIG. 5C. It should be understood that the features for front cable management are omitted in FIGS. 6A-D for clarity of illustration. Whereas the rear cables RC in FIGS. 5A-C take a direct path from the rear of ports 7 to support 710, the rear cables RC' in FIGS. 6A-D each extend from the rear of a port 7 to a guide 730, and then to support 710. Guide 730 may be a cable clamp, a hook-and-loop strap, or any other suitable structure to couple the rear cables RC' to the guide 730. Guide 730 may also include one or more vertical fins extending upward from the corresponding tray 331R, 331L. The vertical fins may help ensure that the rear cables RC' maintain minimum bending radius, for example preventing one or more of the rear cables from turning too sharply as they pass through the guide 730. Preferably, guide 730 is positioned substantially in the medial-to-lateral center of each tray 331R, 331L. In the illustrated embodiment, twelve ports 7 are included on each tray 331R, 331L. With this configuration, the rear cables RC' extending from the rear of the left-most and right-most port 7 may each be the longest cables. The rear cables RC' extending from the rear of the ports 7 adjacent the left-most and right-most ports may be slightly shorter. This pattern may continue until the middle-most two ports 7, which may include rear cables RC' that are shorter than the rear cables extending from any other ports.

Figure 6C:
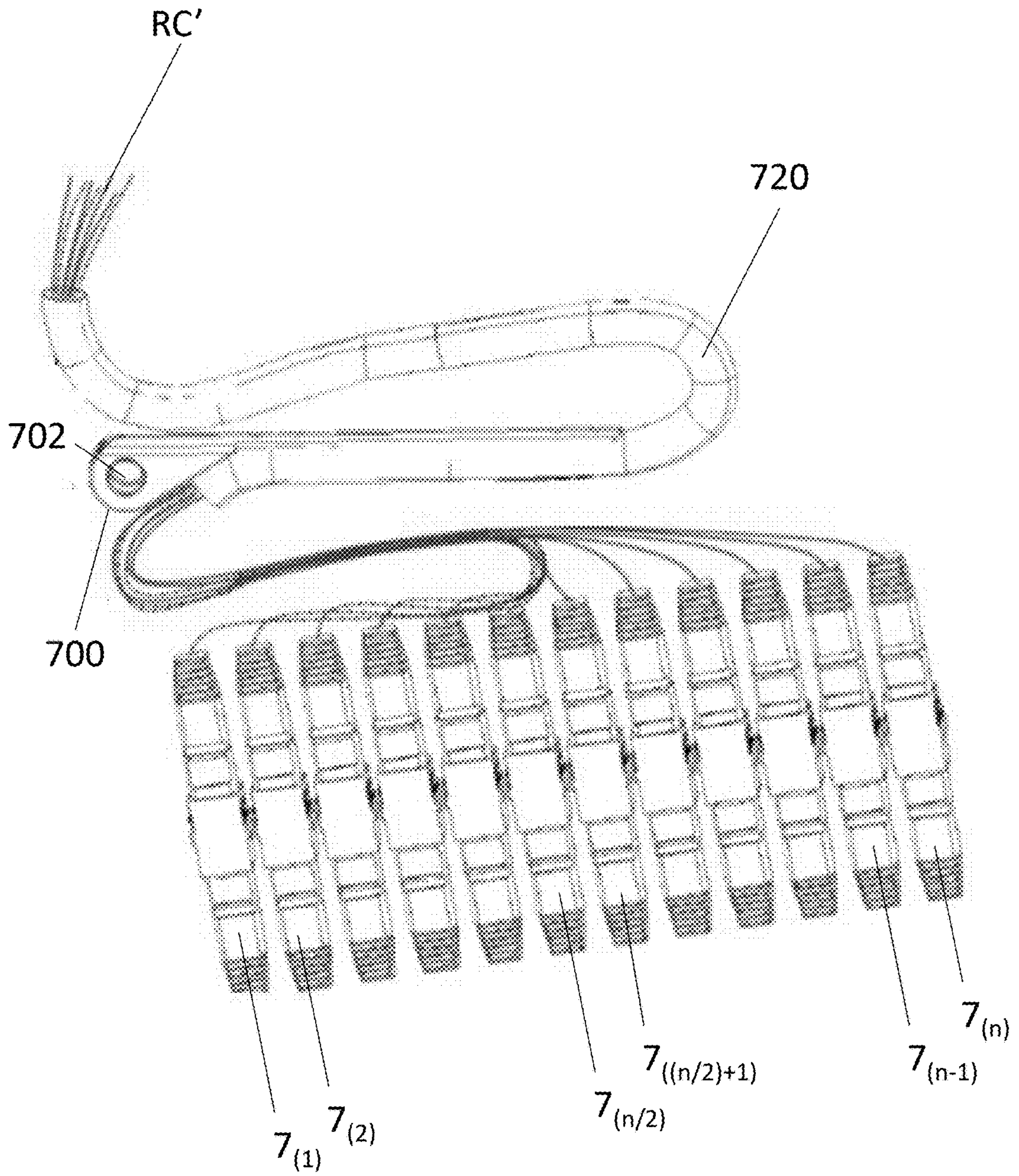
FIG. 6C is an isolated view of the rear cables having the staggered length configuration.

FIG. 6C illustrates the ports 7, rear cables RC', guiding arm 700 and cable sleeve 720 of cable management system 600 with other components omitted for clarity of illustration. Although twelve ports 7 are illustrated, it should be understood that the staggered rear cable RC' length configuration may be used with any number of ports 7. For example, if an even number (n) of ports 7 are used, the first and $n^{th}$ port may be coupled to the longest rear cables RC', with the second and $(n-1)^{th}$ port having slightly shorter cables, and so on until the $(n/2)^{th}$ and $((n/2)+1)^{th}$ rear cables which have rear cables with the shortest lengths. If an odd number (n) of ports 7 are used, the system may follow the same pattern with the exception that the middle-most port has the shortest length rear cable RC'.

Figure 6D:
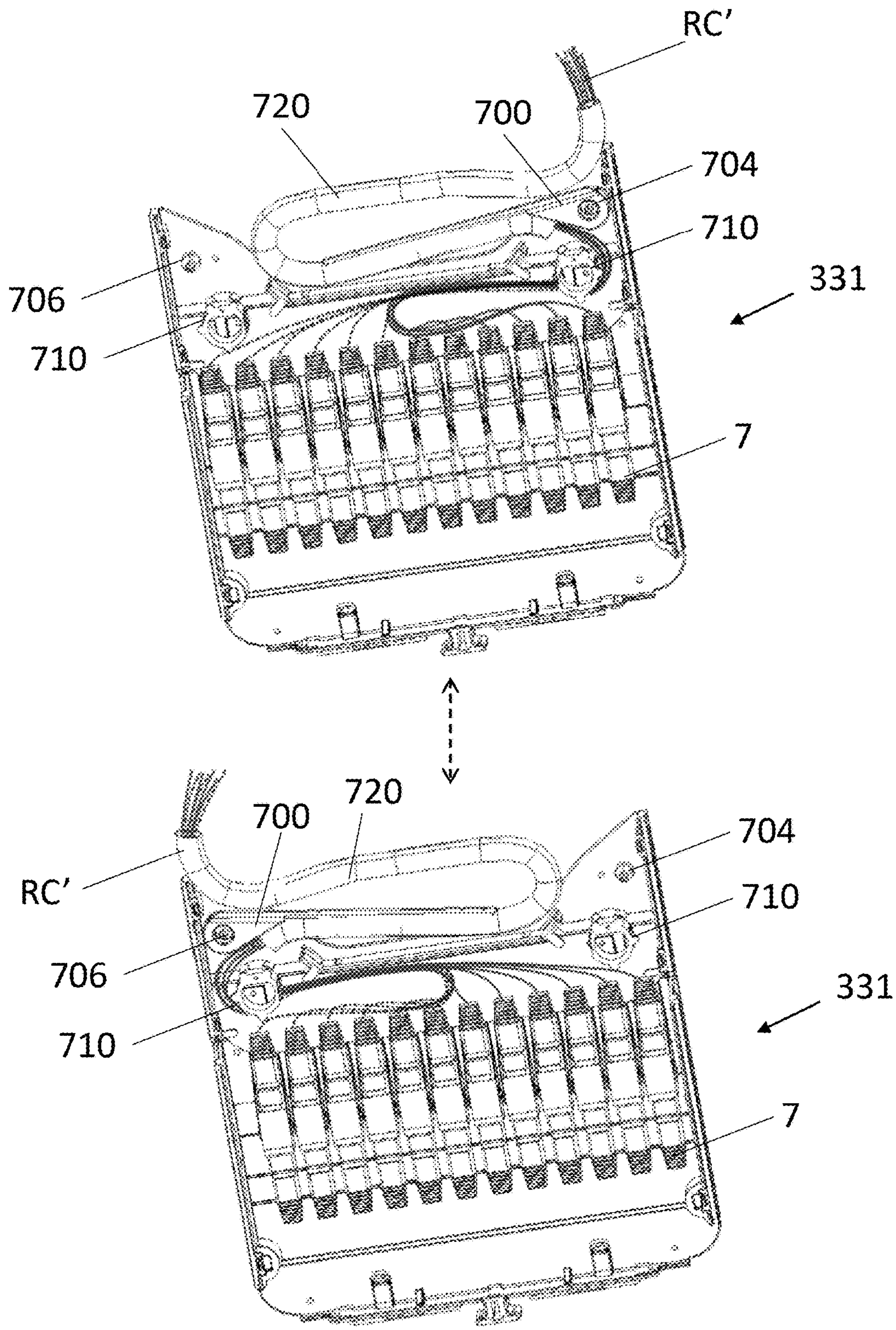
FIG. 6D is a schematic view of the switchability of the positioning of certain components of the cable management system of FIG. 6A.

The staggered rear cable RC' length configuration may provide a benefit of ease of installation at either the left tray or right tray in a patch panel housing, as described in the following. Still referring to FIG. 6C, arm 700 may include an aperture 702. Aperture 702 may be configured to engage a corresponding pin extending from tray 331L or 331R. Also, as noted above, each tray 331L and 331R may include such a pin on both the lateral and medial sides of the rear of the tray. It should be understood that other engagement features may be suitable, for example a pin on the arm 700 that fits within a corresponding aperture in the trays 331L, 331R. With this configuration, a tray installed at a left or right side tray slot of the housing may be switched to the other side tray slot of the housing without difficulty. For example, the top of FIG. 6D illustrates tray 331 in the position of tray 331R shown in FIG. 6A in the stored condition. The rear cables RC' extend from the rear of ports 7, to guide 730 (not labeled in FIG. 6D), and to support 710 on the right side of tray 331. The rear cables RC' then extend into cable sleeve 720, a portion of which is attached to arm 700, and then to the rear of the housing. If a user desires to switch installation of the tray 331 from the right tray slot position to the left tray slot position of tray 331L as shown in FIG. 6A, the staggered length configuration of rear cables RC' may allow such a switch. As shown in the bottom of FIG. 6D, arm 700 may be lifted from pin 704 and its installation position relative to the midline of the patch panel housing may be reversed, with aperture 702 extending over pin 706 on the left side of the tray 331. The rear cables RC' may be repositioned to extend around guide 710 on the left of the tray 331 instead of the right of the tray. Instead of the rear cables RC' exiting the rear of the housing on the right side as shown in the top of FIG. 6D, in the new position shown on the bottom of FIG. 6D, the rear cables exit the rear of the housing on the left side. This switching of the installation position of the arm 700, such that the arm 700 is easily installed at the left tray or right tray in a patch panel housing, may be difficult or impossible without the staggered length configuration of the rear cables RC'.

Figure 7:
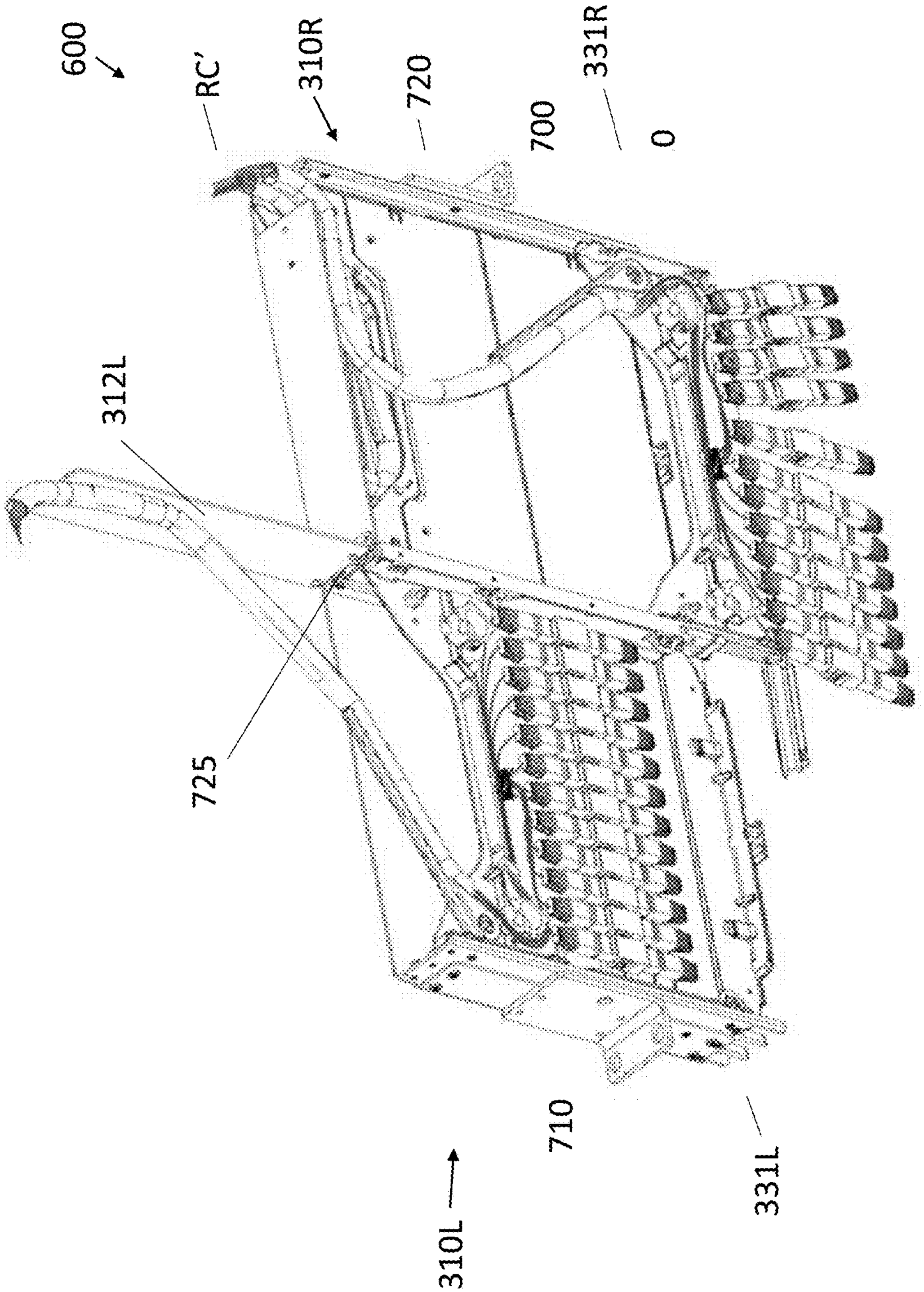
FIG. 7 is a top cutaway view of the cable management system of FIG. 6A with a hinged rear housing section.

FIG. 7 illustrates cable management system 600 with a slight modification to the embodiment shown in FIG. 6A. In particular, the rear wall 312R of patch panel device 310R and the rear wall 312L of patch panel device 310L may each be provided with a hinged connection. As illustrated, the rear walls 312R, 312L may each be hingedly coupled to the respective patch panel device by a hinge 725 positioned at or near the midline between patch panel device 310R and 310L. With this configuration, rear walls 312R, 312L may be opened from the rear of the housing in order to access the rear of each tray 331L, 331R. As noted above, a portion of each cable sleeve 720 may be fastened to the respective rear wall 312R, 312L, such that upon swinging a particular rear wall to the open condition, such as that illustrated from rear wall 312L in FIG. 7, the corresponding cable sleeve may move with the rear wall. It should be understood that for the various cable management systems described herein, individual modules may be provided that each include a plurality of trays 331L or 33R vertically stacked therein. In the embodiment of FIG. 7, each module includes three vertically stacked trays 331L or 331R, such that opening rear wall 312L provides access to the rear of all three trays 331L of the unit. However, it should be understood that each module may include a larger or smaller number of trays.

Figure 8:
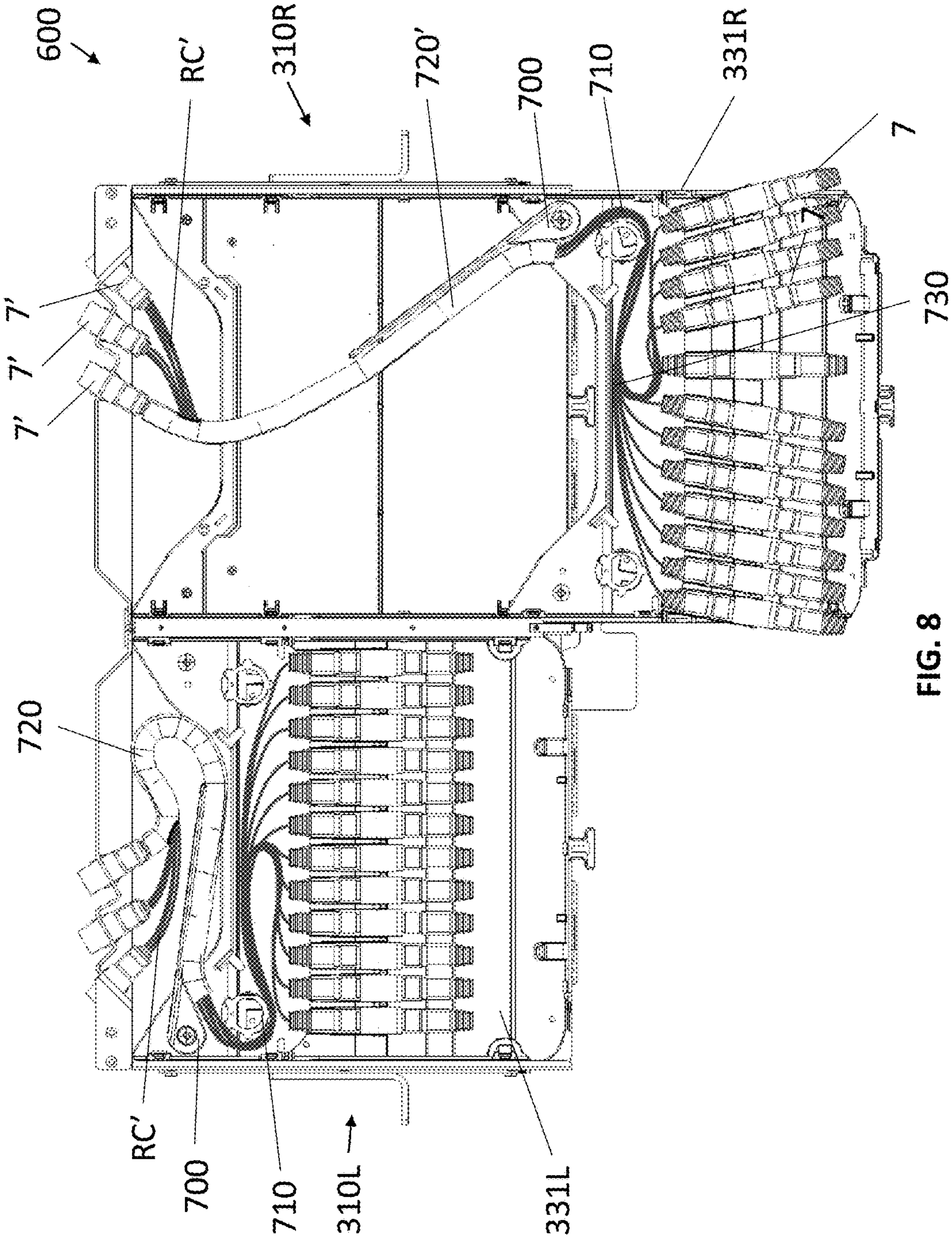
FIG. 8 is a top cutaway view of the cable management system of FIG. 5B with rear cables having a staggered length configuration.

FIG. 8 illustrates a cable management system 600 similar to that shown in FIG. 5B but with a staggered rear cable RC' configuration and an alternate version of a cable sleeve 720'. In particular, rear cables RC' extend from the rear faces of ports 7 to guide 730 and support 710. From support 710, rear cables RC' extend through a first longitudinal end cable sleeve 720', a portion of which may be operatively coupled to guide arm 700, for example by adhesives, clips, or any other suitable fastener. One rear cable RC' or one group of rear cables RC' may extend through a second longitudinal end of cable sleeve 720' to one of the rear connectors 7', which may take any suitable form including, for example, multiple-fiber push-on/push-off ("MPO") connectors. A second rear cable RC' or a second group of rear cables RC' may extend through an opening in the lateral wall of cable sleeve 720' between the first and second longitudinal ends. If cable sleeve 720' is a split sleeve, the second rear cable RC' or second group of rear cables RC' may extend through the split of the sleeve. In other examples, a separate hole or aperture may be provided in the side wall of cable sleeve 720' so that the second rear cable RC' or second group of rear cables RC' may extend through an opening in the side wall of the cable sleeve 720' and to a second one of the rear connectors 7'. Similarly, a third rear cable RC' or a third group of rear cables RC' may extend through an opening in the lateral wall of cable sleeve 720' between the first and second longitudinal ends and to a third rear connector 7'. In some embodiments, the second and third groups of rear cables RC' may extend through the same opening in the lateral wall of cable sleeve 720'. In other embodiments, the second and third groups of rear cables RC' may extend through separate openings in the lateral wall of cable sleeve 720' between the first and second longitudinal ends of the cable sleeve.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A communication system, comprising: a housing; a tray having a plurality of ports each having a rear face, the tray movably engaged with the housing and having a first position substantially inside the housing and a second position substantially outside the housing; and a guide arm having a first end pivotably attached to the tray between the plurality of ports and a rear of the housing, and a second free end opposite the first end, the guide arm adapted to rotate from a first rotational position in which the guide arm is substantially parallel to the rear of the housing to a second rotational position in which the second free end points toward the rear of the housing, wherein in an installed state of the communication system a plurality of rear cables is respectively connected to the rear faces of the plurality of ports and the plurality of rear cables is operably coupled to the guide arm, and in an uninstalled state of the communication system the plurality of rear cables is operably uncoupled from the guide arm, and wherein in the installed state of the communication system, movement of the tray between the first position and the second position causes rotation of the guide arm and the plurality of rear cables, and in the uninstalled state of the communication system, movement of the tray between the first position and the second position does not cause rotation of the guide arm.

2. The communication system of claim 1, further comprising a cable sleeve having a first portion coupled to the guide arm and a second portion coupled to the rear of the housing, the cable sleeve adapted to retain the plurality of rear cables therein.

3. The communication system of claim 2, wherein the cable sleeve is a split sleeve.

4. The communication system of claim 2, wherein the system further comprises the plurality rear cables.

5. The communication system of claim 4, wherein the plurality of rear cables exit through an opening in the rear of the housing, the opening positioned on a first side of the housing.

6. The communication system of claim 5, wherein the first end of the guide arm is positioned in alignment with the first side of the housing.

7. The communication system of claim 5, wherein the plurality of rear cables is coupled to one or more connectors positioned on the rear of the housing.

8. The communication system of claim 4, wherein the plurality of ports includes outermost ports positioned on opposite sides of the tray and innermost ports positioned between the outermost ports, first rear cables of the plurality of rear cables coupled to the outermost ports having a length that is greater than a length of second rear cables of the plurality of rear cables coupled to the innermost ports.

9. The communication system of claim 8, wherein each of the plurality of rear cables is operatively coupled to a cable guide positioned at a medial-to-lateral center of the tray.

10. The communication system of claim 9, wherein the cable guide is positioned distal to the plurality of ports and proximal to the guide arm.

11. The communication system of claim 8, wherein the tray includes a first pin on a first side of the tray and the guide arm includes an aperture adapted to accept the first pin therein.

12. The communication system of claim 11, wherein the tray includes a second pin on a second side of the tray opposite the first side of the tray, the aperture of the guide arm adapted to accept the second pin therein.

13. The communication system of claim 1, wherein the rear of the housing is hingedly coupled to a side of the housing so that the rear of the housing is pivotable between a closed state and an open state in which opposing faces of the rear are accessible to a user.

14. A communication system, comprising: a housing; a tray having a plurality of ports adapted to couple to cables, the tray movably engaged with the housing and having a first position substantially inside the housing and a second position substantially outside the housing; and a guide arm having a first end pivotably attached to the tray, and a second free end opposite the first end, the guide arm adapted to rotate from a first rotational position in which the guide arm is substantially parallel to a rear of the housing to a second rotational position in which the second free end is not parallel to the rear of the housing; wherein in an installed state of the communication system a plurality of the cables is respectively connected to the plurality of ports and the plurality of cables is operably coupled to the guide arm, and in an uninstalled state of the communication system the plurality of cables is operably uncoupled from the guide arm, and wherein in the installed state of the communication system, movement of the tray between the first position and the second position causes rotation of the guide arm and the plurality of rear cables, and in the uninstalled state of the communication system, movement of the tray between the first position and the second position does not cause rotation of the guide arm.

* * * * *